(12) United States Patent
Mishra et al.

(10) Patent No.: US 10,545,886 B2
(45) Date of Patent: Jan. 28, 2020

(54) CLOCK LINE DRIVING FOR SINGLE-CYCLE DATA OVER CLOCK SIGNALING AND PRE-EMPTION REQUEST IN A MULTI-DROP BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/167,193

(22) Filed: Oct. 22, 2018

(65) Prior Publication Data

US 2019/0171589 A1    Jun. 6, 2019

Related U.S. Application Data

(60) Provisional application No. 62/594,962, filed on Dec. 5, 2017.

(51) Int. Cl.
*G06F 13/16* (2006.01)
*G06F 13/42* (2006.01)
*G06F 13/376* (2006.01)

(52) U.S. Cl.
CPC .......... *G06F 13/161* (2013.01); *G06F 13/376* (2013.01); *G06F 13/4291* (2013.01); *G06F 2213/0008* (2013.01); *G06F 2213/0064* (2013.01)

(58) Field of Classification Search
CPC .. G06F 13/161; G06F 13/376; G06F 13/4291; G06F 2213/0008; G06F 2213/0064
See application file for complete search history.

(56) References Cited

U.S. PATENT DOCUMENTS

| 5,151,698 A * | 9/1992 | Pophillat .............. H04B 14/026 341/52 |
| 2015/0286606 A1 | 10/2015 | Sengoku et al. |
| 2017/0109305 A1 | 4/2017 | Liu et al. |

OTHER PUBLICATIONS

International Search Report and Written Opinion—PCT/US2018/057018—ISA/EPO—dated Jan. 14, 2019.

* cited by examiner

*Primary Examiner* — Ernest Unelus
*Assistant Examiner* — Ronald T Modo
(74) *Attorney, Agent, or Firm* — Loza & Loza LLP

(57) ABSTRACT

Systems, methods, and apparatus are described that enable single-cycle pre-emption on a serial bus. An apparatus is coupled to a serial bus through a bus interface and includes a controller configured to provide a clock signal on the first line of the serial bus, transmit data on a second line of the serial bus in accordance with timing provided by the clock signal, cause the line driver to enter a high impedance state after transmitting a first edge in the clock signal while transmitting the data on the second line, detect a first pulse on the clock signal while the line driver is in the high impedance state, cause the line driver to exit the high impedance state prior to transmitting a second edge in the clock signal, and initiate bus arbitration after detecting the first pulse. The first edge and the second edge may transition in opposite directions.

25 Claims, 19 Drawing Sheets

CLOCK LINE DRIVING FOR SINGLE-CYCLE DATA OVER CLOCK SIGNALING AND PRE-EMPTION REQUEST IN A MULTI-DROP BUS

PRIORITY CLAIM

This application claims priority to and the benefit of U.S. Provisional Patent Application Ser. No. 62/594,962 filed in the U.S. Patent Office on Dec. 5, 2017, the entire content of this application being incorporated herein by reference as if fully set forth below in its entirety and for all applicable purposes.

TECHNICAL FIELD

The present disclosure relates generally to an interface between processing circuits and peripheral devices and, more particularly, to reducing latency and expanding data communication throughput on a serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, such as a multi-drop serial bus or a parallel bus. General-purpose serial interfaces are known in the industry, including the Inter-Integrated Circuit (I2C or I²C) serial bus and its derivatives and alternatives. Certain serial interface standards and protocols are defined by the Mobile Industry Processor Interface (MIPI) Alliance, including the I3C, system power management interface (SPMI), and the Radio Frequency Front-End (RFFE) interface standards and protocols.

The I2C bus is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

The protocols used on an I3C bus derive certain implementation aspects from the I2C protocol. Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

The RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links.

The SPMI standards provide a hardware interface that may be implemented between baseband or application processors and peripheral components. In some implementations, the SPMI is deployed to support power management operations within a device.

Multi-drop buses such as I2C, I3C, RFFE, SPMI, etc. operate in half-duplex mode, and typically do not efficiently handle urgent requests for access to the bus by devices with high-priority data for transmission. As applications have become more complex, demand for throughput over the serial bus can escalate and capacity continues to rise and there is a continuing demand for improved bus management techniques.

SUMMARY

Certain aspects of the disclosure relate to systems, apparatus, methods and techniques that enable alerts and/or requests for bus arbitration to be sent in a first direction over a serial bus while a datagram is being transmitted in a second direction over the serial bus.

In various aspects of the disclosure, a method for transmitting data over a serial bus includes providing a clock signal on a first line of the serial bus, transmitting data on a second line of the serial bus in accordance with timing provided by the clock signal, causing a driver of the first line of the serial bus to enter a high impedance state after transmitting a first edge in the clock signal while transmitting the data on the second line, detecting a first pulse on the clock signal while the driver of the first line is in the high impedance state, causing the driver of the first line of the serial bus to exit the high impedance state prior to transmitting a second edge in the clock signal and initiating bus arbitration after detecting the first pulse. The first edge and the second edge may transition in opposite directions.

In one aspect, arbitration includes the identification of reverse direction signaling or pulses applied to the clock signal within a portion of a clock cycle. In one example, the reverse direction signaling or pulses is applied to half-cycle of a clock signal. The reverse direction signaling or pulses may include an identification of the device generating the reverse direction signaling or pulses.

In certain aspects, the method includes determining identity of a first device that transmitted the first pulse based on temporal position of the first pulse between the first edge in the clock signal and the second edge in the clock signal. The method may further include detecting a second pulse on the clock signal while the driver of the first line is in the high impedance state, and determining identity of a second device that transmitted the second pulse based on temporal position of the first pulse between the first edge in the clock signal and the second edge in the clock signal. In one example, a winning device may be selected from the first device and the second device based on an outcome of the bus arbitration, and the winning device may be provided with access to the serial bus. In another example, ownership of the serial bus may be relinquished to the winning device.

In various aspects of the disclosure, an apparatus includes a bus interface configured to couple the apparatus to a serial bus, the bus interface including a line driver adapted to drive a first line of the serial bus. The apparatus may include a controller configured to provide a clock signal on the first line of the serial bus, transmit data on a second line of the serial bus in accordance with timing provided by the clock signal, cause the line driver to enter a high impedance state after transmitting a first edge in the clock signal while transmitting the data on the second line, detect a first pulse on the clock signal while the line driver is in the high impedance state, cause the line driver to exit the high impedance state prior to transmitting a second edge in the clock signal, and initiate bus arbitration after detecting the first pulse. The first edge and the second edge may transition in opposite directions.

In various aspects of the disclosure, a processor-readable storage device, accessible to one or more processors, stores instructions and data. The processor-readable storage device may be a transitory or non-transitory storage device. The processor-readable storage device may store instructions that cause one or more processors to provide a clock signal on a first line of the serial bus, transmit data on a second line of the serial bus in accordance with timing provided by the clock signal, cause a driver of the first line of the serial bus to enter a high impedance state after transmitting a first edge in the clock signal while transmitting the data on the second line, detect a first pulse on the clock signal while the driver of the first line is in the high impedance state, cause the driver of the first line of the serial bus to exit the high impedance state prior to transmitting a second edge in the clock signal and initiate bus arbitration after detecting the first pulse. The first edge and the second edge may transition in opposite directions, In various aspects of the disclosure, a method for transmitting data over a serial bus includes receiving a clock signal from a first line of the serial bus, receiving data from a second line of the serial bus in accordance with timing provided by the clock signal, transmitting a pulse on the clock signal while the clock signal is in a first signaling state, and participating in bus arbitration after transmitting the pulse on the clock signal.

In certain aspects, the method includes configuring a temporal position of the pulse relative to at least one edge in the clock signal. The temporal position of the pulse may identify a source of the pulse. The temporal position of the pulse may be determined by configuration information. The method may include detecting a first edge in the clock signal, and delaying transmission of the pulse by a period of time that uniquely identifies a source of the pulse and after detecting the first edge in the clock signal.

In one aspect, the method includes acquiring control of the serial bus after winning the bus arbitration.

DETAILED DESCRIPTION

Figure 1:
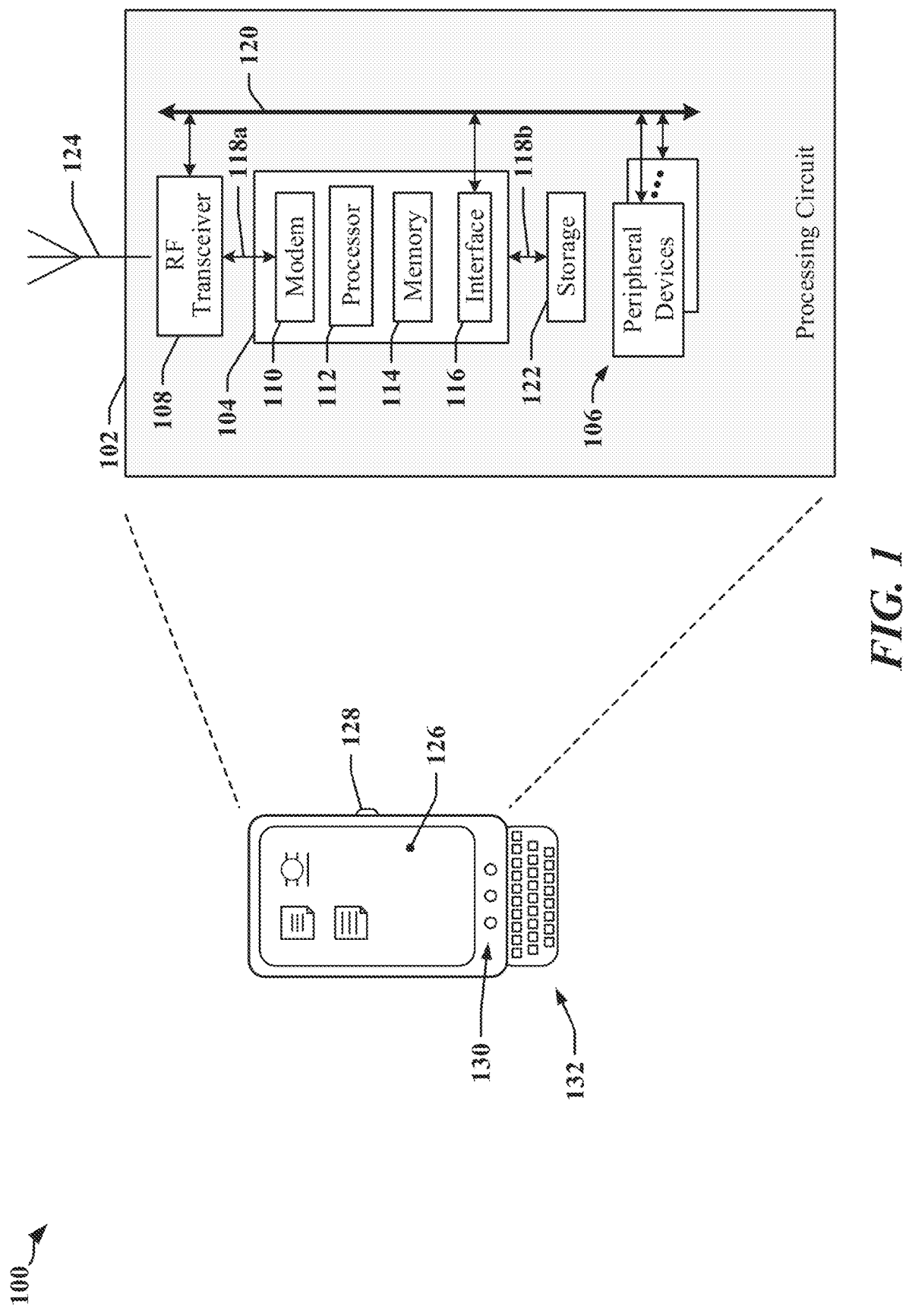
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect application processor or other host device with modems and other peripherals. The serial bus may be operated in accordance with specifications and protocols defined by a standards body. The serial bus may be operated in accordance with a standard or protocol such as the I2C, I3C, serial low-power inter-chip media bus (SLIMbus), system management bus (SMB), RFFE and SPMI protocols that define timing relationships between signals and transmissions. Certain aspects disclosed herein relate to systems, apparatus, methods and techniques that provide a mechanism that can be used on a serial bus to provide alert opportunities that may be employed that improve link performance Certain aspects are described in relation to a serial bus that is operated in accordance with I3C protocols.

A device that has data to be communicated over a half-duplex serial bus must wait for an ongoing transmission to be completed before accessing the serial bus, regardless of the priority of the data to be communicated. Many applications and devices having an absolute or urgent need may pre-empt the bus through an arbitration/pre-emption indication. For example, applications and/or devices may generate and/or require access to real-time data without undue delay (i.e. latency). Certain deterministic applications have strict requirements for latency that may be jeopardized when a device cannot quickly access the serial bus because conventional protocols require that transmission of a current datagram be completed before access to the serial bus is granted irrespective of the priority of the current datagram. In some systems, additional hardware lines may be provided to enable bus pre-emption. The additional lines add to circuit complexity and cost.

According to certain aspects disclosed herein, an in-band alert mechanism can be provided to allow pre-emption. Pre-emption can reduce the number of clock cycles to accomplish datagram pre-emption and/or master ownership hand-off in order to minimize bus latency. Pre-emption can be graceful or ungraceful. Graceful pre-emption may occur when a master device allows the current transmission to complete and/or when the master device provides for a defined expiration time period. Ungraceful pre-emption may cause the immediate termination of the transmission, or allow a defined expiration time period that may result in consequences such as partial configuration, uncertain state, loss of data.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC.

In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
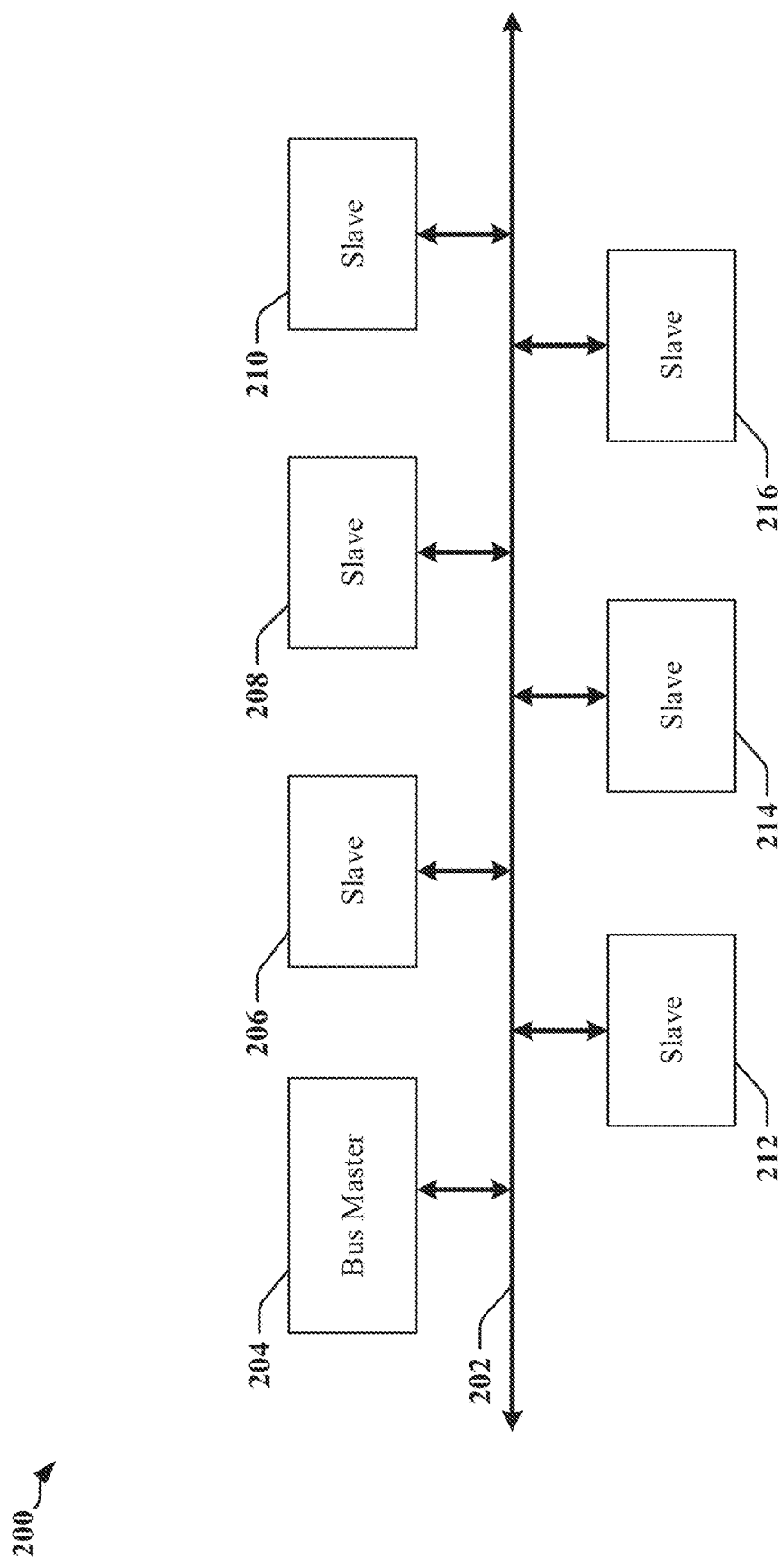
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
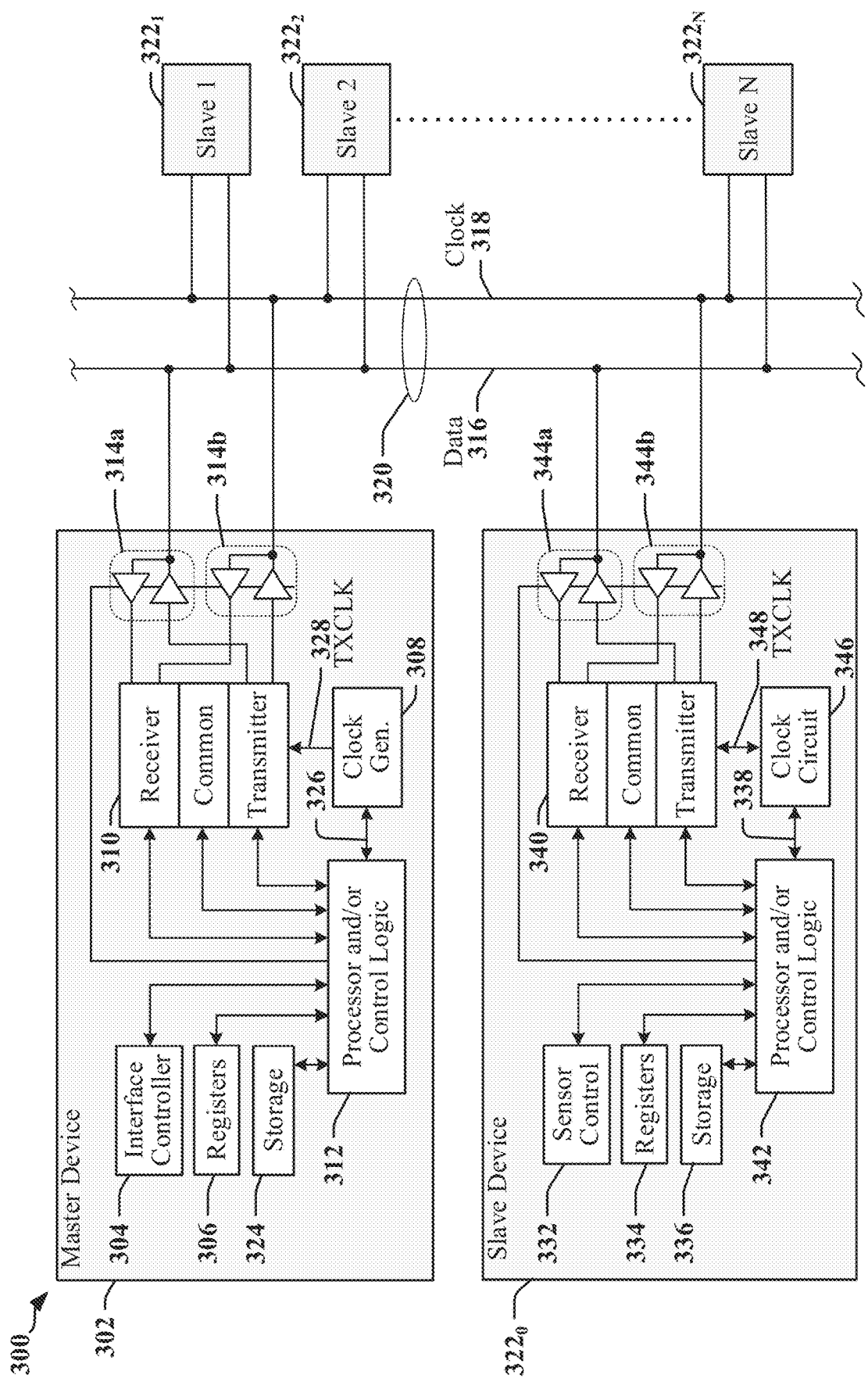
FIG. 3 illustrates a system architecture for an apparatus employing a data link between IC devices.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an application processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that manages access to the serial bus, configures dynamic addresses for slave devices 3220-322N and/or generates a clock signal 328 to be transmitted on a clock line 318 of the serial bus 320. The bus master device 302 may include configuration registers 306 or other storage 324, and other control logic 312 configured to handle protocols and/or higher level functions. The control logic 312 may include a processing circuit having a processing device such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clock signals 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits and modules to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit having a processing device such as a state machine, sequencer, signal processor or general-purpose processor. The transceiver 340 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clock signals 338 may be used by the control logic 342 and other functions, circuits or modules.

The serial bus 320 may be operated in accordance with RFFE, I2C, I3C, SPMI, or other protocol. In some instances, two or more devices 302, $322_0$-$322_N$ may be configured to operate as a bus master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, data is transmitted on a data line 316 of the serial bus 320 based on timing information provided in a clock signal transmitted on the clock line 318 of the serial bus 320. In some instances, data may be encoded in the signaling state, or transitions in signaling state of both the data line 316 and the clock line 318.

Examples of Signaling on a Serial Bus

Examples of data transfers including control signaling, command and payload transmissions are provided by way of example. The examples illustrated relate to I2C and I3C communication to facilitate description of certain aspects of this disclosure. However, the concepts disclosed herein may be applicable to other bus configurations and protocols, including RFFE and SPMI bus configurations.

Figure 4:
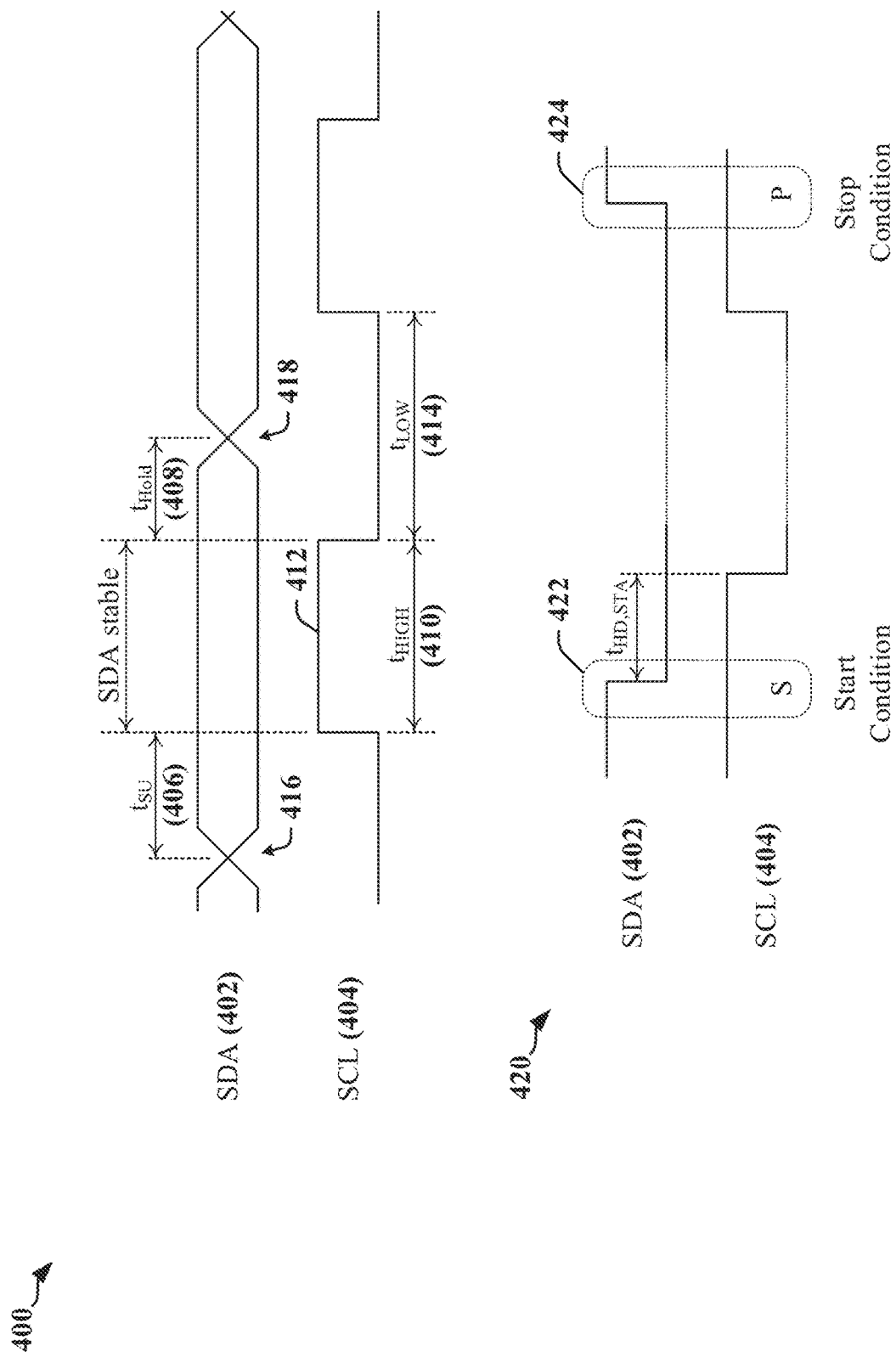
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 on a conventional I2C bus. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

Specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a conventional I2C bus. The I2C protocol provides for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA wire 402 transitions from high to low while the SCL wire 404 is high. The I2C bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. If no I2C slave device responds, the I2C bus master may interpret the high logic state of the SDA wire 402 as a NACK. After transmission of an ACK, the master and slave devices may exchange bytes of information in frames, in which the bytes are serialized such that the most significant bit (MSB) is transmitted first. The transmission of the byte is completed when a stop condition 424 is transmitted by the I2C master device. The stop condition 424 occurs when the SDA wire 402 transitions from low to high while the SCL wire 404 is high. The I2C Specifications require that all transitions of the SDA wire 402 occur when the SCL wire 404 is low, and exceptions may be treated as a start condition 422 or a stop condition 424.

Figure 5:
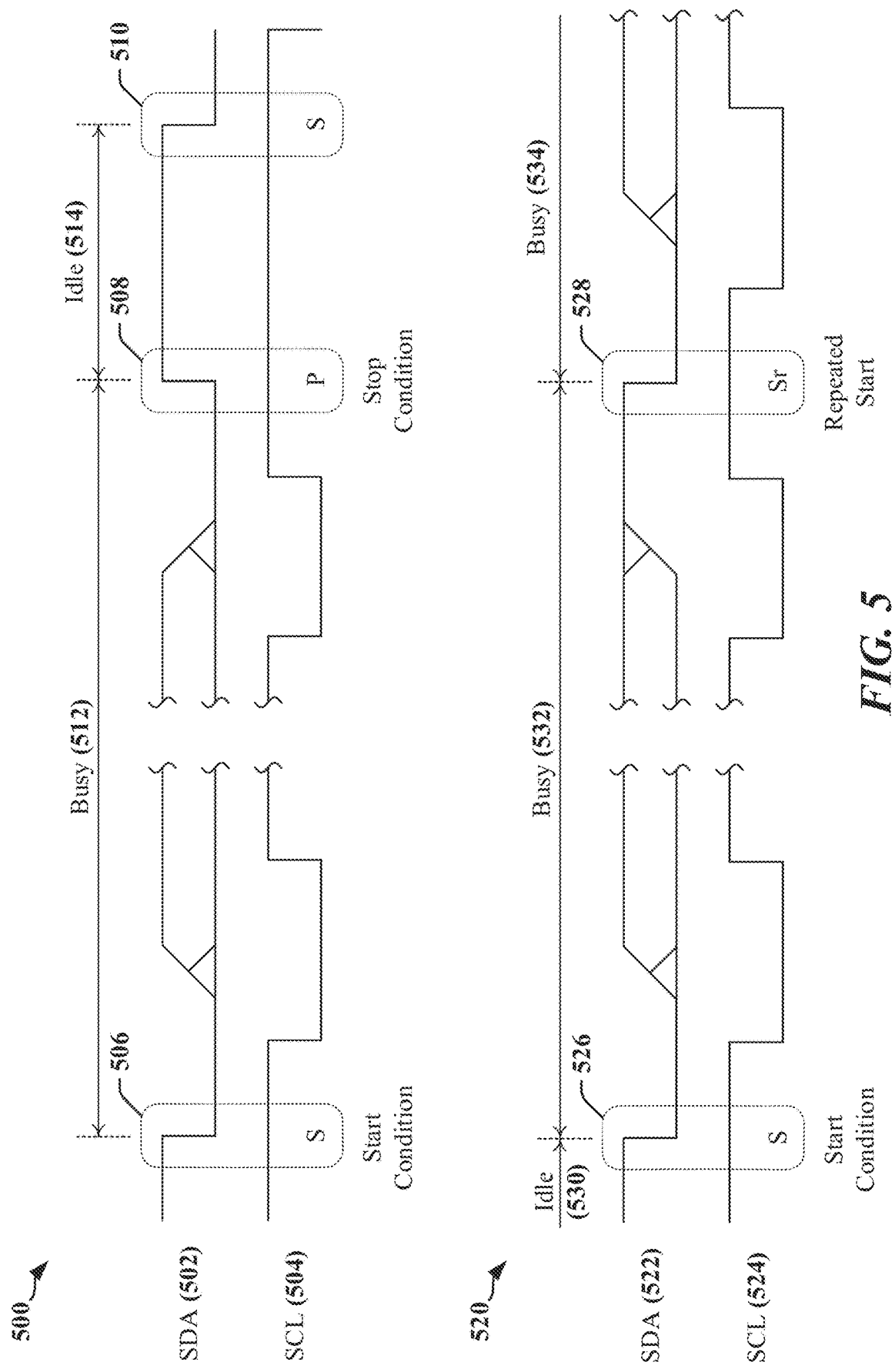
FIG. 5 is a timing diagram that illustrates timing associated with multiple frames transmitted on an I2C bus.

FIG. 5 includes diagrams 500 and 520 that illustrate timing associated with data transmissions on an I2C bus. As illustrated in the first diagram 500, an idle period 514 may occur between a stop condition 508 and a consecutive start condition 510. This idle period 514 may be prolonged, and may result in reduced data throughput when the conventional I2C bus remains idle between the stop condition 508 and the consecutive start condition 510. In operation, a busy period 512 commences when the I2C bus master transmits a first start condition 506, followed by data. The busy period 512 ends when the I2C bus master transmits a stop condition 508 and the idle period 514 ensues. The idle period 514 ends when a second start condition 510 is transmitted.

The second timing diagram 520 illustrates a method by which the number of occurrences of an idle period 514 may be reduced. In the illustrated example, data is available for transmission before a first busy period 532 ends. The I2C bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
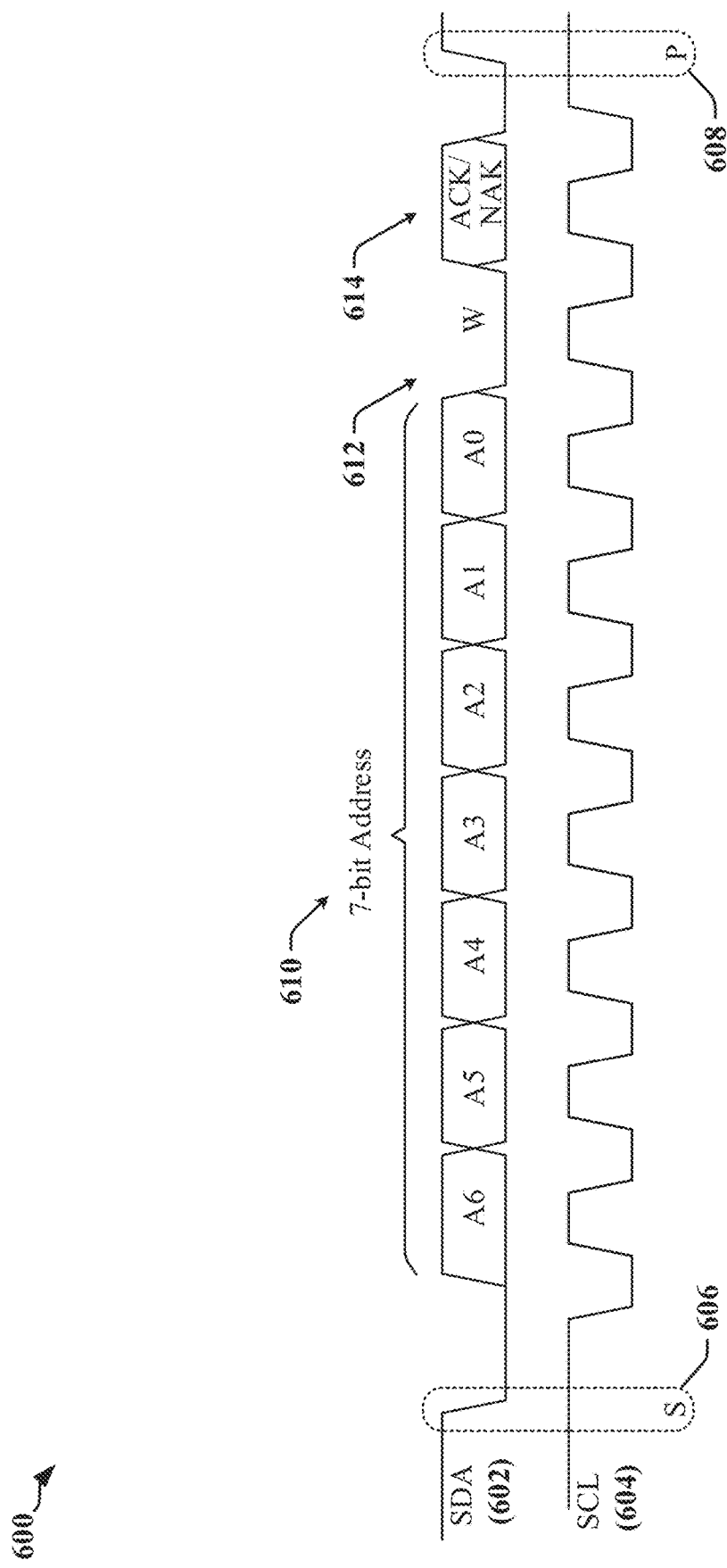
FIG. 6 illustrates timing related to a command word sent to a slave device in accordance with I2C protocols.

FIG. 6 is a diagram 600 that illustrates an example of the timing associated with a command word sent to a slave device in accordance with I2C protocols. In the example, a master device initiates the transaction with a start condition 606, whereby the SDA wire 602 is driven from high to low while the SCL wire 604 remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the I2C bus is in an active state.

Figure 7:
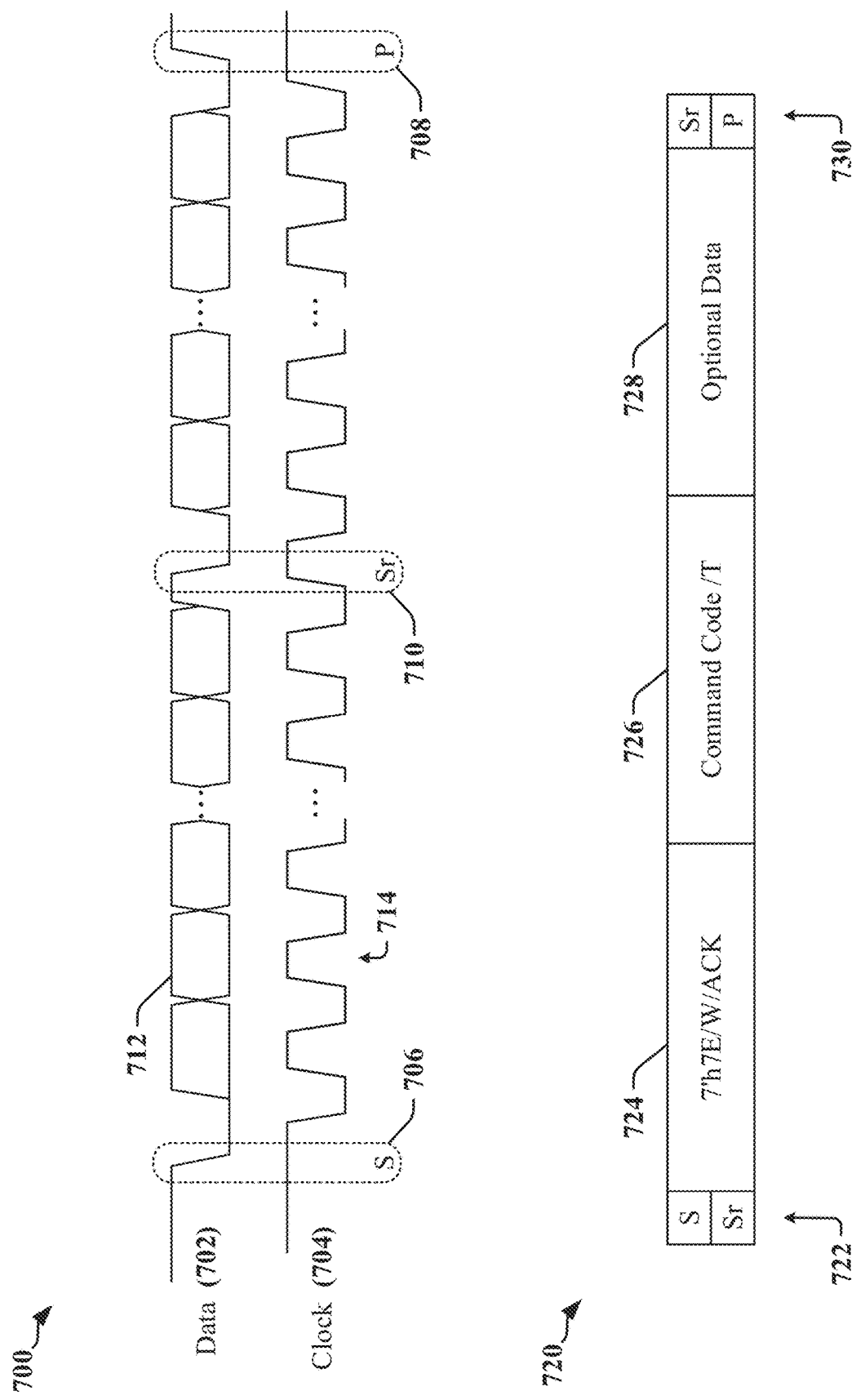
FIG. 7 includes a timing diagram that illustrates signaling on a serial bus when the serial bus is operated in a single data rate (SDR) mode of operation defined by I3C specifications.

FIG. 7 includes a timing diagram 700 that illustrates signaling on a serial bus when the serial bus is operated in a single data rate (SDR) mode of operation defined by I3C specifications. Data transmitted on a first wire (the Data wire 702) of the serial bus may be captured using a clock signal transmitted on a second wire (the Clock wire 704) of the serial bus. During data transmission, the signaling state 712 of the Data wire 702 is expected to remain constant for the duration of the pulses 714 when the Clock wire 704 is at a high voltage level. Transitions on the Data wire 702 when the Clock wire 704 is at the high voltage level indicate a START condition 706, a STOP condition 708 or a repeated START 710.

On an I3C serial bus, a START condition 706 is defined to permit the current bus master to signal that data is to be transmitted. The START condition 706 occurs when the Data wire 702 transitions from high to low while the Clock wire 704 is high. The bus master may signal completion and/or termination of a transmission using a STOP condition 708. The STOP condition 708 is indicated when the Data wire 702 transitions from low to high while the Clock wire 704 is high. A repeated START 710 may be transmitted by a bus master that wishes to initiate a second transmission upon completion of a first transmission. The repeated START 710 is transmitted instead of, and has the significance of a STOP condition 708 followed immediately by a START condition 706. The repeated START 710 occurs when the Data wire 702 transitions from high to low while the Clock wire 704 is high.

The bus master may transmit an initiator 722 that may be a START condition 706 or a repeated START 710 prior to transmitting an address of a slave, a command, and/or data. FIG. 7 illustrates a command code transmission 720 by the bus master. The initiator 722 may be followed in transmission by a predefined command 724 indicating that a command code 726 is to follow. The command code 726 may, for example, cause the serial bus to transition to a desired mode of operation. In some instances, data 728 may be transmitted. The command code transmission 720 may be followed by a terminator 730 that may be a STOP condition 708 or a repeated START 710.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal.

Figure 8:
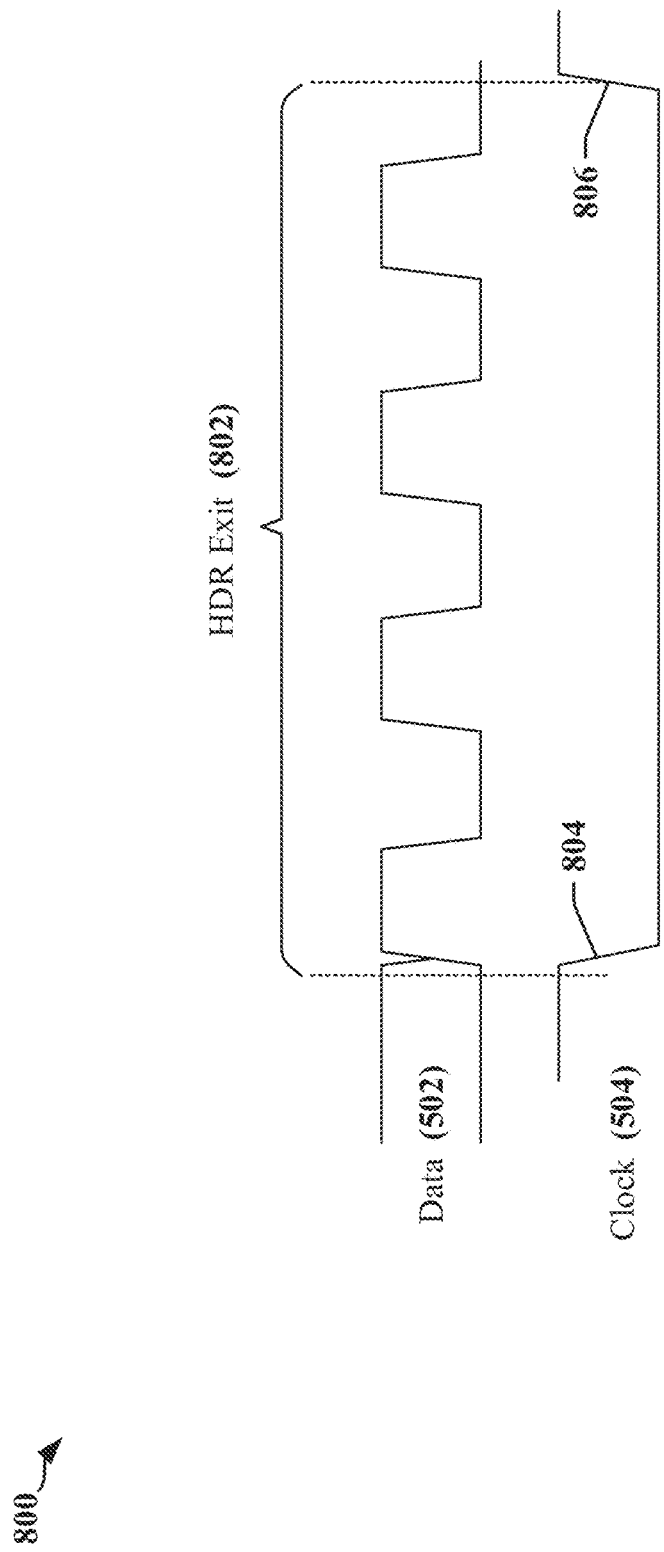
FIG. 8 illustrates an example of signaling transmitted on the Data wire and Clock wire of a serial bus to initiate certain mode changes.

FIG. 8 illustrates an example of signaling 800 transmitted on the Data wire 504 and Clock wire 502 to initiate certain mode changes. The signaling 800 is defined by I3C protocols for use in initiating restart, exit and/or break from I3C HDR modes of communication. The signaling 800 includes an HDR Exit 802 that may be used to cause an HDR break or exit. The HDR Exit 802 commences with a falling edge 804 on the Clock wire 502 and ends with a rising edge 806 on the Clock wire 502. While the Clock wire 502 is in low signaling state, four pulses are transmitted on the Data wire 504. I2C devices ignore the Data wire 504 when no pulses are provided on the Clock wire 502.

In another HDR mode, I3C specifications define a ternary encoding scheme in which transmission of a clock signal is suspended and data is encoded in symbols that define signals that are transmitted over the clock and data lines. Clock information is encoded by ensuring that a transition in signaling state occurs at each transition between two consecutive symbols.

Pre-Emption Requests Transmitted on a Clock Line of a Serial Bus

Figure 9:
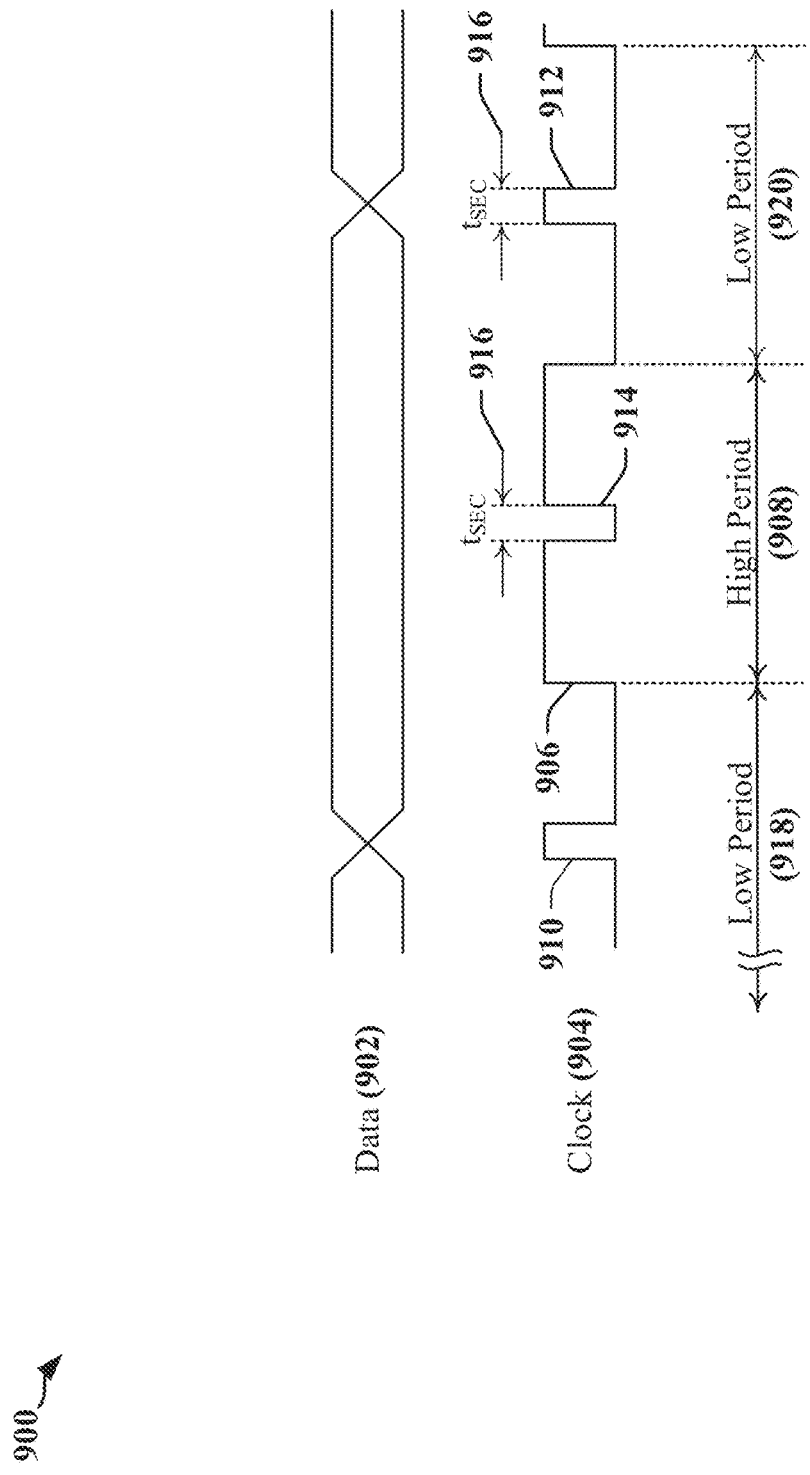
FIG. 9 illustrates the timing of additional pulses that may be added to a clock signal in accordance with certain aspects disclosed herein.

Certain aspects disclosed herein relate to the use of pulse position modulation (PPM) to provide a multipurpose signaling scheme on a multi-point serial bus that couples multiple devices. In one example, one or more pulses may be launched while the clock wire is in a low ('0') signaling state. In another example, one or more pulses may be launched while the clock wire is in a high (1') signaling state. Certain pulse configurations may be interpreted as a pre-emption request. A bus master may respond to a pre-emption request by initiating a graceful or ungraceful pre-emption. Graceful pre-emption may occur when a master device allows the current transmission to complete and/or when the master device provides for a defined expiration time period. Ungraceful pre-emption may cause the immediate termination of the transmission, or allow a defined expiration time period that may result in consequences such as partial configuration, uncertain state, loss of data FIG. 9 is a timing diagram 900 that illustrates the timing of additional pulses 910, 912, 914 that may be added to a clock signal 904 in accordance with certain aspects disclosed herein. In some implementations, conventional I2C devices may be unable to recognize PPM signaling on the clock signal 904. Conventional I2C devices may include a spike filter that causes the additional pulses 910, 912, 914 to be filtered by the bus interface of legacy I2C devices when the duration 916 of the additional pulses 910, 912, 914 is less than the minimum duration specified for a pulse by the I2C protocol. The clock signal 904 may carry one or more pulses 906 that are used to sample and/or capture data 902. These pulses 906 may have a high period 908 of a duration that exceeds the minimum duration specified for a pulse by the I2C protocol. The low period 918 preceding the pulse and the low period 920 following the pulse have durations that exceed the minimum low duration specified by the I2C protocol. In the timing diagram 900, additional pulses 910, 912, 914 may be transmitted on the clock signal 904.

Figure 10:
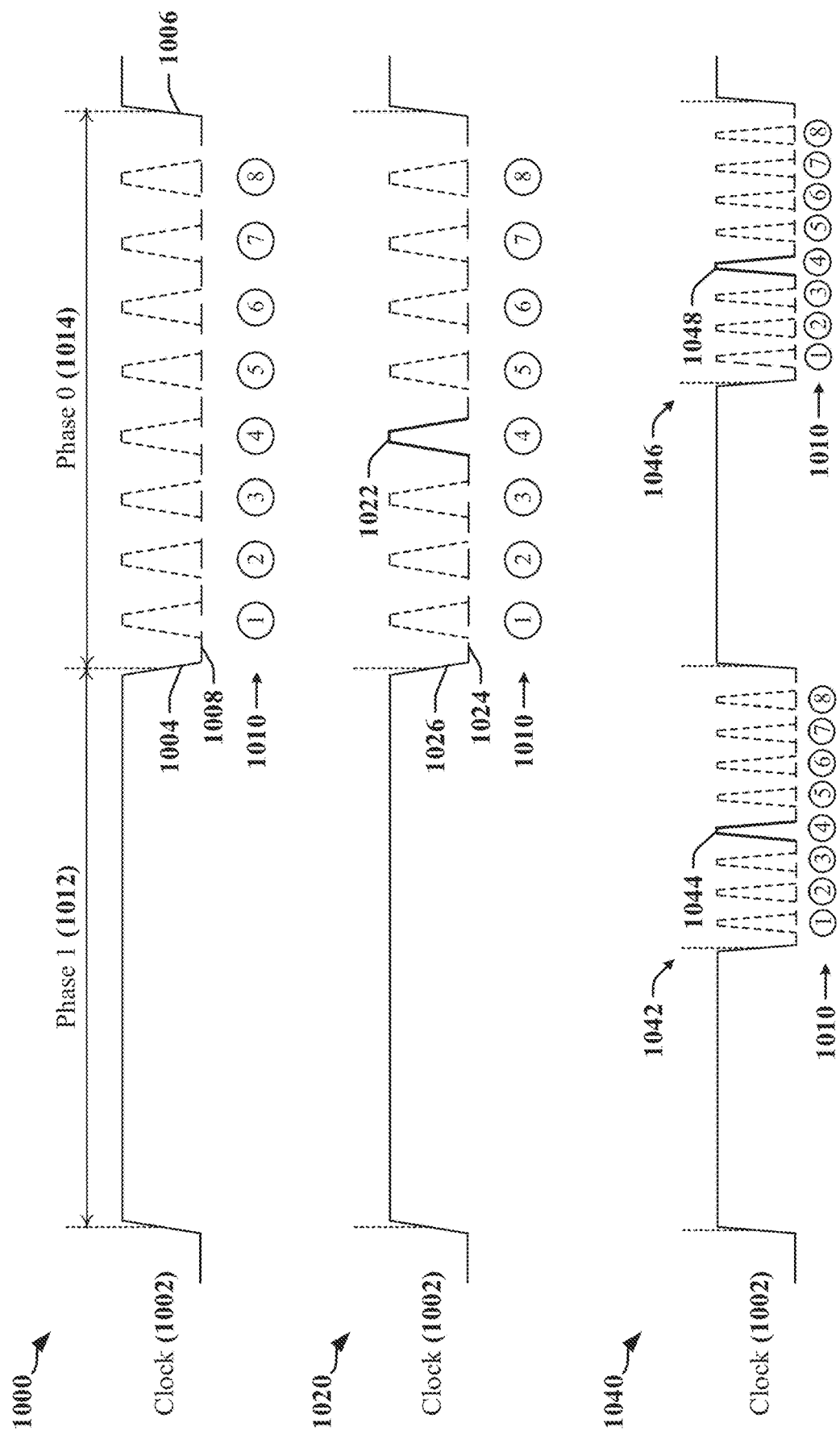
FIG. 10 illustrates a first example of the use of additional pulses that may be added to a clock signal in accordance with certain aspects disclosed herein.
Figure 11:
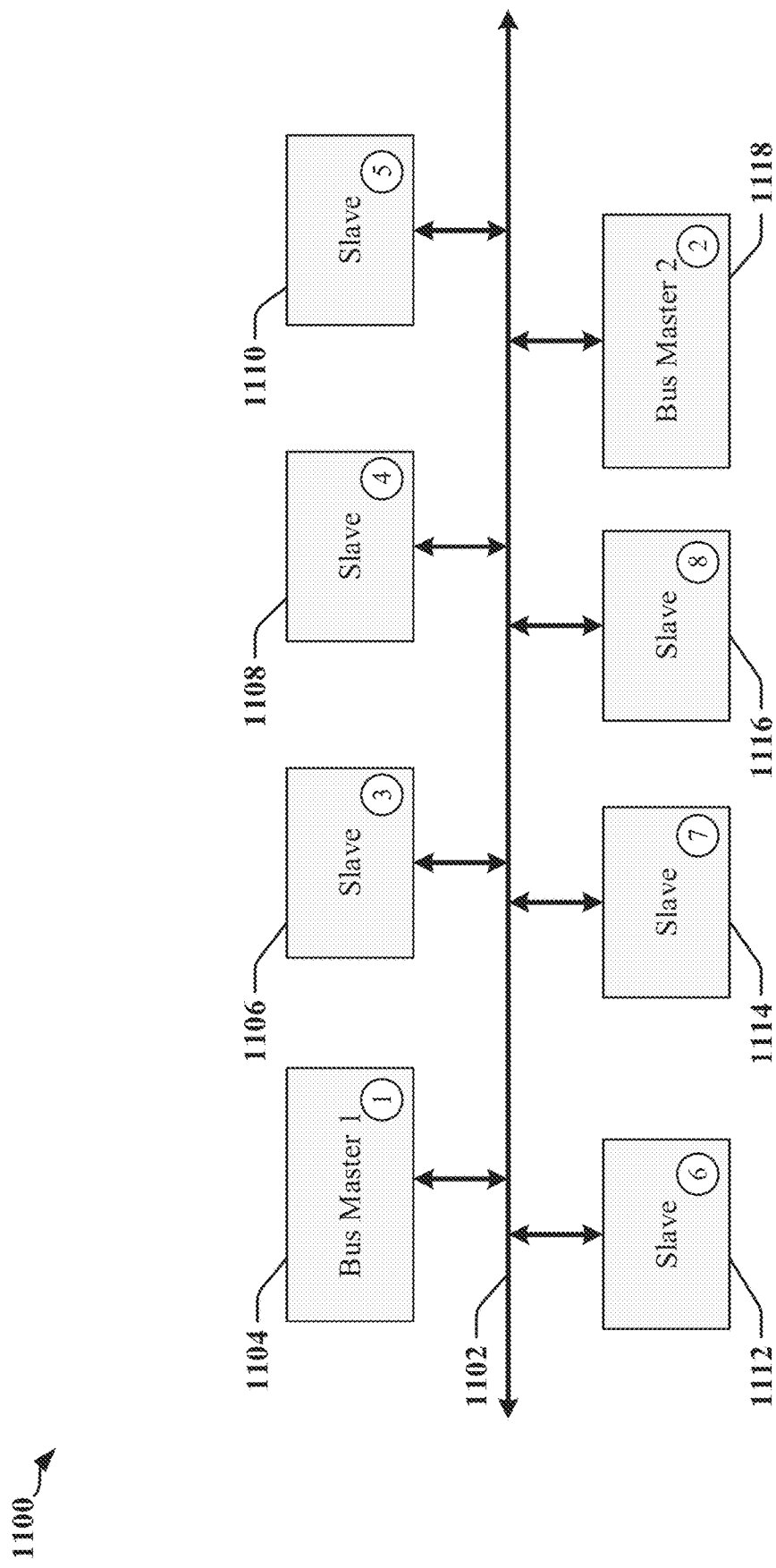
FIG. 11 illustrates a communication interface in which a plurality of devices is connected using a serial bus adapted to carry additional pulses in a clock signal in accordance with certain aspects disclosed herein.

FIG. 10 includes timing diagrams 1000, 1020, 1040 illustrating an example of additional pulses that may be used to encode information in accordance with certain aspects disclosed herein. In the example, pulse position modulation (PPM) is employed to provide signaling opportunities in timeslots 1010 that permit information, alerts, and/or exceptions to be asserted in the system 1100 illustrated in FIG. 11, for example. In one example, the position of a pulse with respect to one or more edges 1004, 1006 of a clock signal transmitted on a clock line 1002 may identify a device launching the pulse. In another example, the position of the pulse with respect to a center point between the edges 1004, 1006 of the clock signal may identify the device launching the pulse. The presence of one or more pulses may indicate that a bus pre-emption is requested.

Each of the timeslots 1010 may be assigned to a device 1104, 1106, 1108, 1110, 1112, 1114, 1116, 1118 coupled to a serial bus 1102. In one example, earlier occurring timeslots 1010 may be assigned to master devices 1104, 1118. In another example, certain timeslots 1010 may be assigned according to device priority. A number (N) of sub-divisions of the clock phase (i.e., phase 1 1012 or phase 0 1014) may be defined to accommodate 1 to N PPM pulses and enable resolution of the identity of a device 1104, 1106, 1108, 1110, 1112, 1114, 1116, 1118 that is requesting pre-emption within a clock cycle. In some instances, a single device can request pre-emption, and N=1.

A current bus master device 1104 or 1118 may interpret a detected PPM pulse 1022 as a bus pre-emption request by the device 1108 that launched the PPM pulse 1022. In certain implementations, the current bus master device 1104 or 1118 may be configured to terminate a current transmission after detecting a first PPM pulse 1022. In some instances, the current bus master device 1104 or 1118 may be configured to terminate a current transmission after detecting PPM pulses 1044, 1048 that are repeated in a number of successive clock cycles. As illustrated, the PPM pulses 1044, 1048 are repeated in the same phases 1042, 1046 of two successive clock cycles. The use of repeated PPM pulses 1044, 1048 may mitigate noise-related issues that can cause false detection of PPM pulses.

Arbitration may be performed when multiple devices 1104, 1106, 1108, 1110, 1112, 1114, 1116, 1118 drive a pulse in the same clock cycle and/or same phase of the clock cycle. In one example, a simple round-robin scheme may provide equal access to the serial bus 1102 while avoiding servicing of excessive bus requests by any one device 1104, 1106, 1108, 1110, 1112, 1114, 1116, 1118. In various aspects of this description, arbitration may include the identification of reverse direction signaling or pulses applied to the clock signal within a portion of a clock cycle. In one example, the reverse direction signaling or pulses is applied to half-cycle of a clock signal. The reverse direction signaling or pulses may include an identification of the device generating the reverse direction signaling or pulses. Other forms of arbitration may be implemented in some applications and for various reasons. For example, contention-based arbitration schemes may be employed as needed to support legacy devices.

An output of a line driver in the current bus master device 1104 or 1118 may enter a high-impedance state 1008, 1024 after driving an edge 1004, 1026 of the clock signal transmitted on a clock line 1002. The clock line 1002 may be held in the low state by a pull-down resistor, keeper circuit, or other circuit. One or more of the devices 1104, 1106, 1108, 1110, 1112, 1114, 1116, 1118 that desires or needs to request access to the serial bus 1102 may enable respective line drivers during their assigned timeslots 1010 in order to drive a PPM pulse 1022, 1044, 1048. Devices 1104, 1106, 1108, 1110, 1112, 1114, 1116, 1118 that do not desire or need access to the serial bus 1102 may leave their respective line drivers in a high impedance state during their assigned timeslots 1010.

Figure 12:
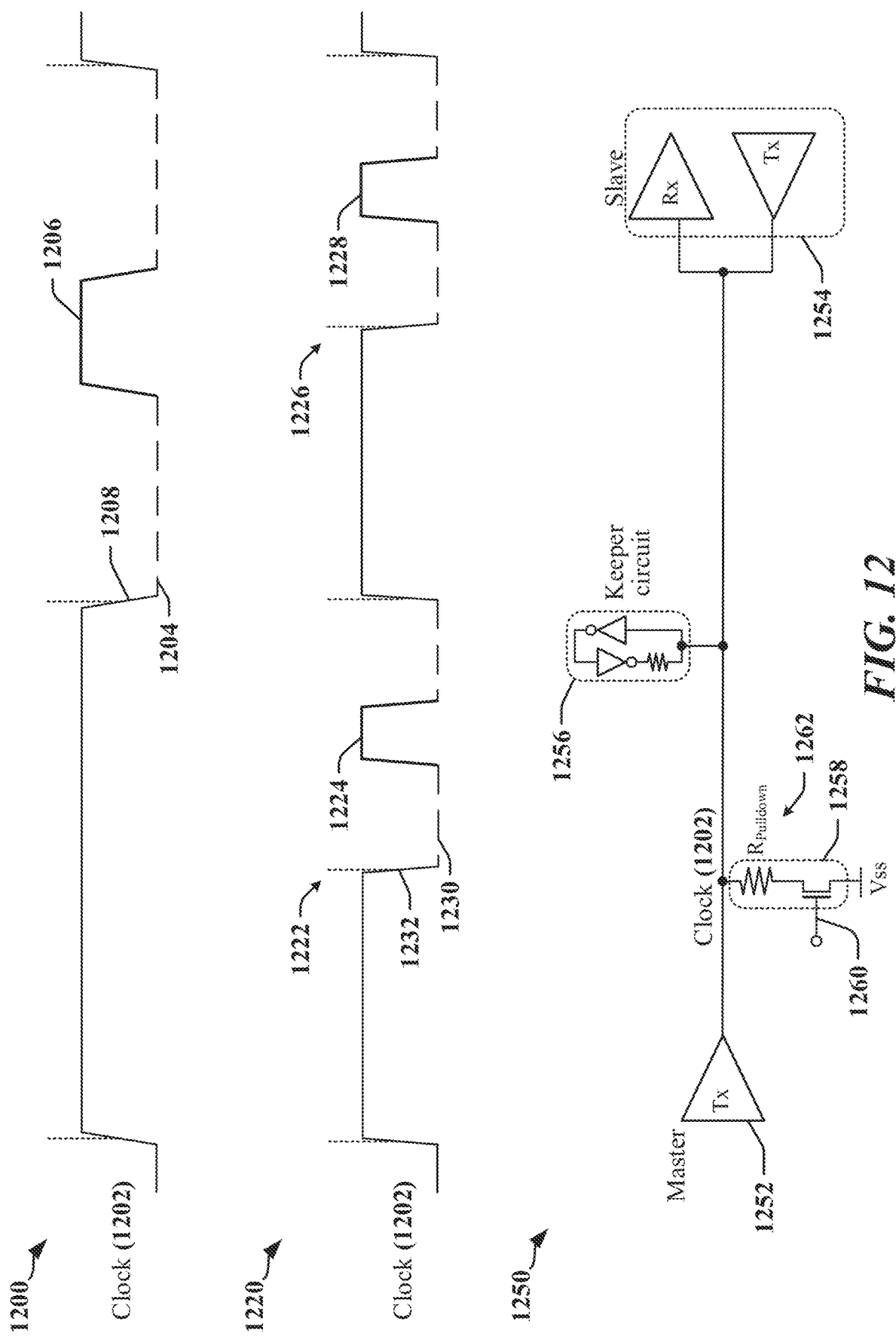
FIG. 12 illustrates a second example of the use of additional pulses that may be added to a clock signal in accordance with certain aspects disclosed herein.

FIG. 12 includes timing diagrams 1200, 1220 illustrating a second example of the use of additional pulses 1206, 1224, 1228 to encode information. In this example, PPM may be implemented to provide signaling opportunities to request and/or initiate a handover between master devices 1104, 1118 on a two-master serial bus implementation. In this example, the additional pulses 1206, 1224, 1228 may have a longer duration, since information need not be encoded in the position of the additional pulses 1206, 1224, 1228 with respect to any edge or center of a clock phase.

A current bus master device 1104 or 1118 may interpret an additional pulse 1206 as a bus ownership request by the other bus master device 1118 or 1104, which launched the additional pulse 1206. In certain implementations, the current bus master device 1104 or 1118 may be configured to terminate a current transmission after detecting a first PPM pulse 1224. In some implementations, the current bus master device 1104 or 1118 may be configured to terminate a current transmission after detecting additional pulses 1224, 1228 that are repeated in a number of successive clock cycles. As illustrated, the additional pulses 1224, 1228 are repeated in the same phases 1222, 1226 of the successive clock cycles. The use of repeated additional pulses 1224, 1228 may mitigate noise related issues that can cause false detection of PPM pulses.

An output of a line driver in the current bus master device 1104 or 1118 may enter a high-impedance state 1204, 1230 after driving an edge 1208, 1232 of the clock signal transmitted on a clock line 1202. The clock line 1202 may be held in the low state by a pull-down resistor 1262, keeper circuit 1256, or other circuit. A master device 1118 or 1104 that desires or needs to gain control of the serial bus 1102 may enable a line driver in order to drive a PPM pulse 1224, 1228.

FIG. 12 illustrates an example of line termination 1250 that may employ a keeper circuit 1256 or a switchable pull-down 1258 to facilitate pre-emption requests in accordance with certain aspects disclosed herein. In some implementations, the output of a line driver 1252 of a bus master may present a high impedance to the clock line 1202 that permits a transceiver 1254 of a slave device to drive the clock line 1202 without contention. The clock line 1202 may be held in the low state using the keeper circuit 1256 or the switchable pull-down 1258. In one example, the keeper circuit 1256 may be configured as a positive feedback circuit that drives the clock line 1202 through a high impedance output, and receives feedback from the clock line 1202 through a low impedance input. The keeper circuit 1256 may be configured to maintain the last asserted voltage on the clock line 1202. The keeper circuit 1256 can be easily overcome by line drivers 1252 in the bus master or slave device. In another example, a pull-down resistor 1262 may be coupled to the clock line 1202 through a switch controlled by a pull-down enable signal 1260.

Figure 13:
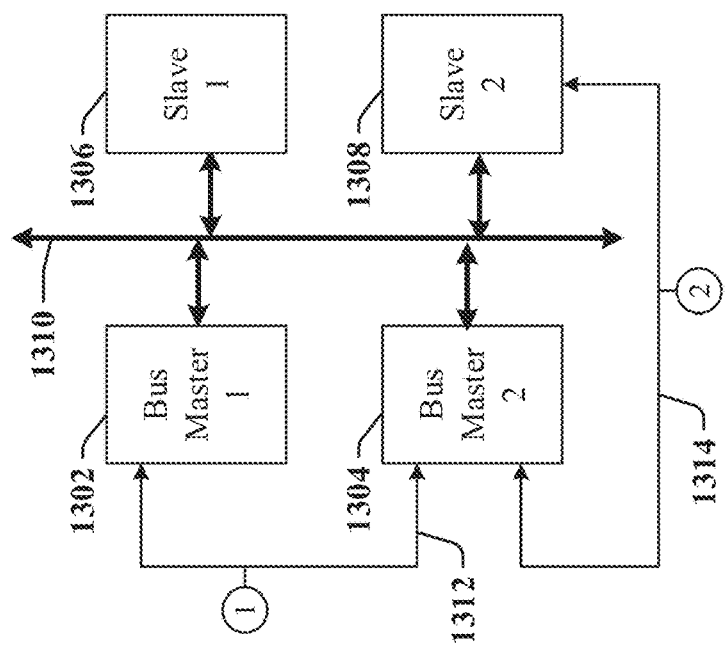
FIG. 13 illustrates certain differences between pre-emption techniques provided by a conventional system and pre-emption techniques in a system operated in accordance with certain aspects disclosed herein.

FIG. 13 illustrates certain differences between pre-emption techniques provided by a conventional system 1300 and pre-emption techniques in a system 1320 operated in accordance with certain aspects disclosed herein to provide single-cycle data over clock signaling and pre-emption requests in a multi-drop bus.

In the conventional system 1300, a serial bus 1310 couples a first bus master device 1302, a second bus master device 1304, a first slave device 1306 and a second slave device 1308. In the conventional system 1300, a first type of signaling is performed over a first physical link 1312 that is provided between the first bus master device 1302 and the second bus master device 1304. The first bus master device 1302 may be operating as the current bus master and the source of the clock signal that controls transmissions over the serial bus 1310. The first physical link 1312 provides an out-of-band signal path that permits the bus master devices 1302, 1304 to exchange control signaling, including bus handover requests. In one example, the second bus master device 1304 may send a bus handover request over the first physical link 1312 to the current bus master (in the first bus master device 1302) in order to pre-empt operations on the serial bus 1310 and/or gain ownership of the serial bus.

In the conventional system 1300, a second type of signaling is performed over a second physical link 1314 that is provided between the second slave device 1328 and the second bus master device 1304. The second physical link 1314 provides an out-of-band signal path that permits the second slave device 1328 to transmit requests, include bus pre-emption requests. In one example, the second bus master device 1304 may send a handover request over the first physical link 1312 to the second bus master device 1304 in order to pre-empt operations on the serial bus 1310.

In a system 1320 operated in accordance with certain aspects disclosed herein, a serial bus 1330 couples a first bus master device 1322, a second bus master device 1324, a first slave device 1326 and a second slave device 1328. The first type of signaling can be performed in-band, and physical links connecting the devices are unneeded. The first bus master device 1322 may be operating as the current bus master and the source of the clock signal that controls transmissions over the serial bus 1330. The first bus master device 1322 may be considered to be providing a clock signal 1340 in the forward direction, as illustrated by the clock pulse 1342 in the clock signal 1340. The second bus master device 1324 may send a bus handover request in a reverse-direction to the first bus master device 1322 in the form of a pulse 1224 in the clock signal 1340 in order to pre-empt operations on the serial bus 1330 and/or gain ownership of the serial bus.

The second type of signaling may be performed in-band. The second slave device 1328 may send a bus pre-emption request in a reverse-direction to the second bus master device 1324 in the form of a pulse 1224 in the clock signal 1340 in order to request a bus pre-emption.

An opportunity for in-band signaling may be provided in one phase 1222 of a clock cycle. In the illustrated example, the clock signal is in the low state when a reverse-direction pulse 1224 can be sent.

Figure 14:
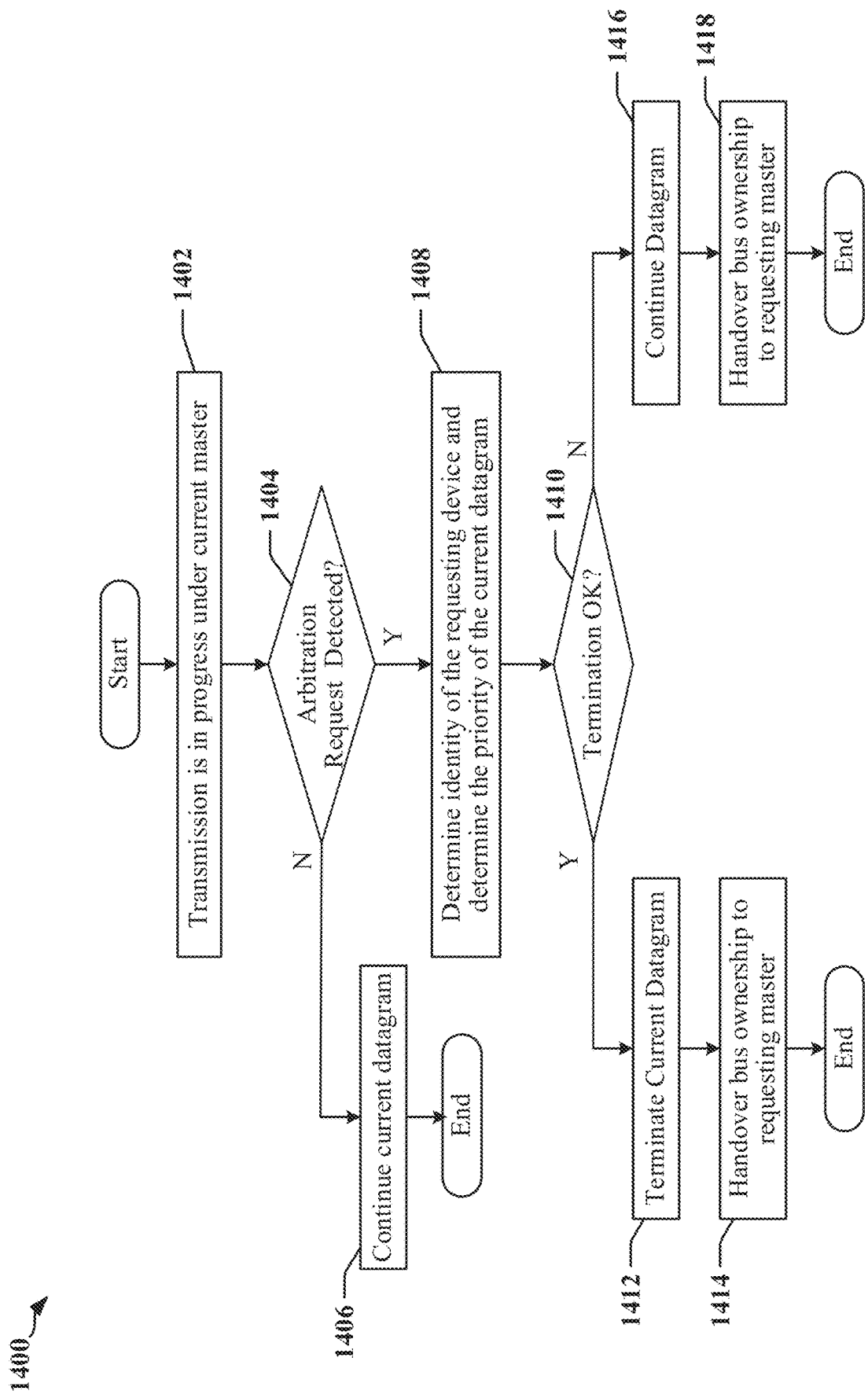
FIG. 14 is a flowchart illustrating a process for transferring bus ownership in accordance with certain aspects disclosed herein.

FIG. 14 is a flowchart 1400 illustrating a process that may be used to request and/or initiate a bus handover. At block 1402, a current bus master device 1104 or 1118 may be engaged in exchange of a datagram. The current bus master device 1104 or 1118 may be transmitting or receiving. The current bus master device 1104 or 1118 may monitor one or both phases of a bus clock signal transmitted on the clock line 1202 to determine if the other bus master device 1118 or 1104 has driven an additional pulse 1206 or combination of pulses 1206, 1224, 1228 on the clock line 1202. An additional pulse 1206 or combination of pulses 1224, 1228 may indicate a request for bus ownership. The request for bus ownership may be handled as a request for arbitration to determine which current bus master device 1104 or 1118 is to control the serial bus. If no request for arbitration is determined at block 1404, then the current bus master device 1104 or 1118 may continue with exchange of the current datagram at block 1406. If a request for arbitration is determined at block 1404, then the current bus master device 1104 or 1118 may identify the requesting bus master device 1118 or 1104 at block 1408. When more than two bus master devices 1104 or 1118 are coupled to the serial bus, the current bus master device 1104 or 1118 may determine identity of the requesting bus master device 1118 or 1104 based on position of the pulse in the clock signal.

At block 1408, the current bus master device 1104 or 1118 may determine if the requesting bus master device 1118 or 1104 has a greater priority than the current bus master device 1104 or 1118. If at block 1410 the current bus master device 1104 or 1118 determines that ownership of the serial bus should be handed over to the requesting bus master device 1118 or 1104, then the current bus master device 1104 or 1118 may terminate transmission of the current datagram at block 1412 before handing over bus ownership to the requesting bus master device 1118 or 1104 at block 1414.

If at block 1410 the current bus master device 1104 or 1118 determines that ownership of the serial bus should not be handed over to the requesting bus master device 1118 or 1104, then the current bus master device 1104 or 1118 may continue with exchange of the current datagram at block 1416. The current bus master device 1104 or 1118 may hand over bus ownership to the requesting bus master device 1118 or 1104 at block 1418.

Examples of Processing Circuits and Methods

Figure 15:
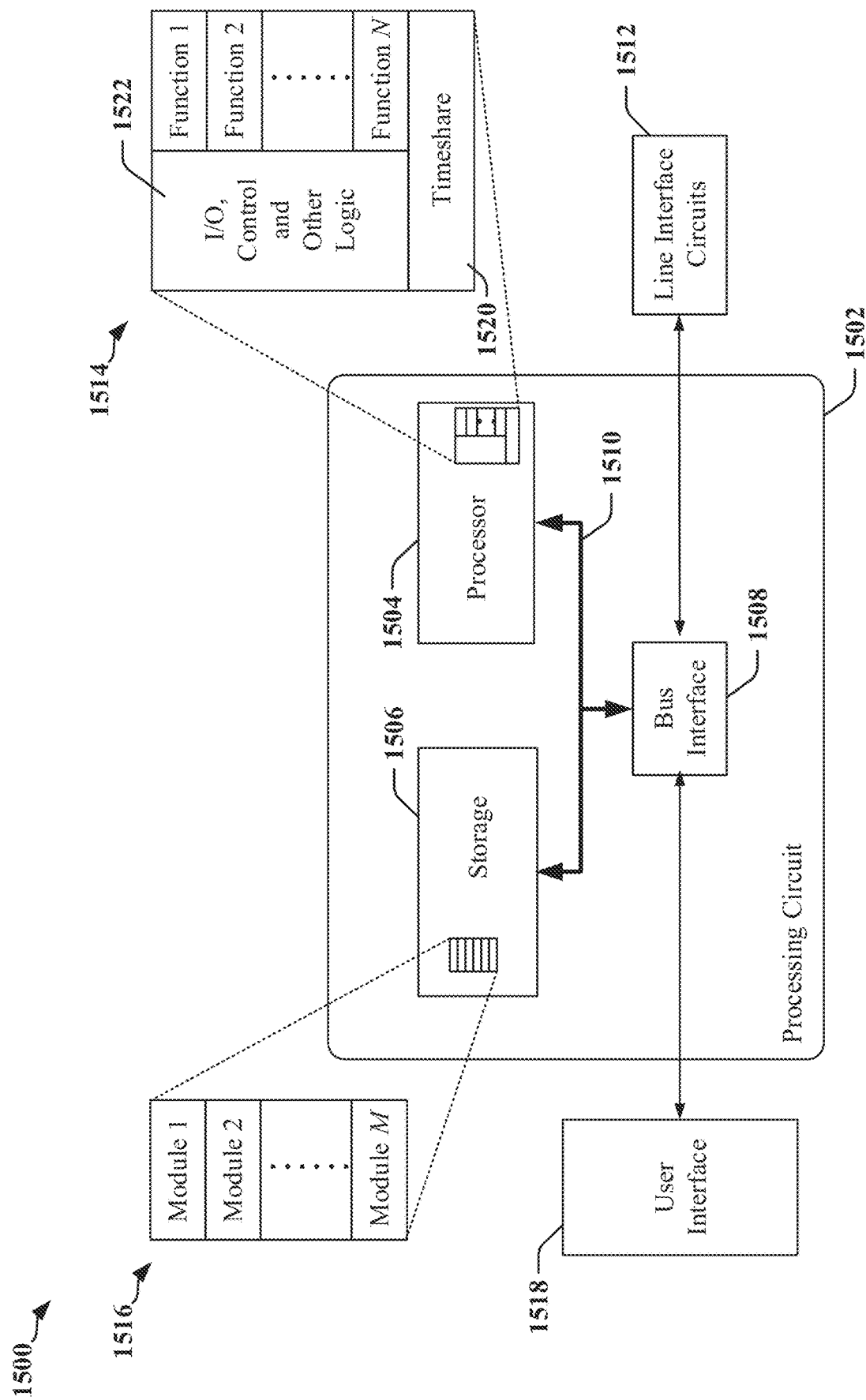
FIG. 15 is a block diagram illustrating an example of an apparatus employing a processing circuit that may be adapted according to certain aspects disclosed herein.

FIG. 15 is a diagram illustrating an example of a hardware implementation for an apparatus 1500 employing a processing circuit 1502 that may be configured to perform one or more functions disclosed herein. In accordance with various aspects of the disclosure, an element, or any portion of an element, or any combination of elements as disclosed herein may be implemented using the processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation. In various examples, the processing circuit 1502 may be implemented using a state machine, sequencer, signal processor and/or general-purpose processor, or a combination of such devices and circuits.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512. A transceiver 1512 may be provided for each networking technology supported by the processing circuit. In some instances, multiple networking technologies may share some or all of the circuitry or processing modules found in a transceiver 1512. Each transceiver 1512 provides a means for communicating with various other apparatus over a transmission medium. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
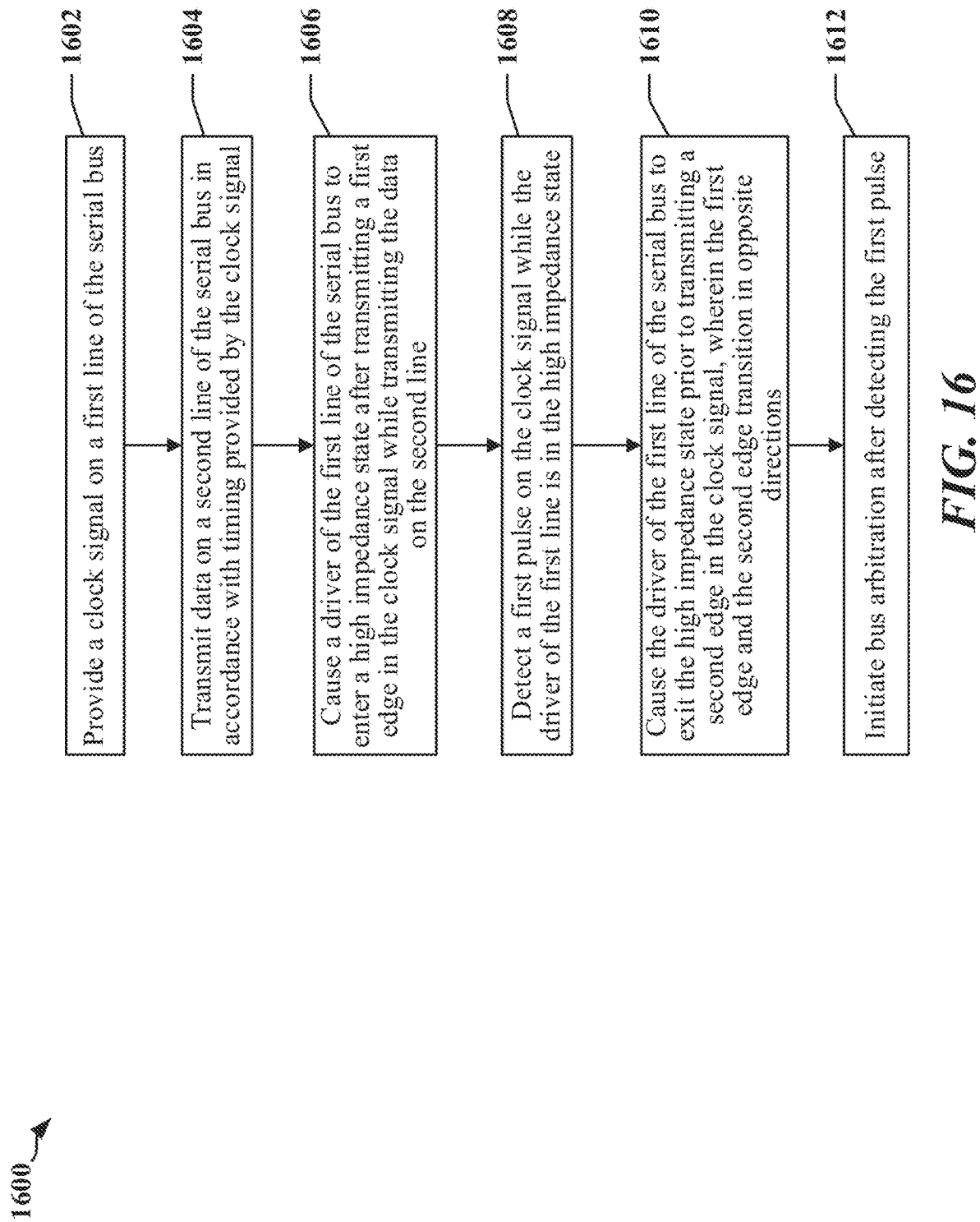
FIG. 16 is a flowchart illustrating a process that may be performed at a sending device coupled to a serial bus in accordance with certain aspects disclosed herein.

FIG. 16 is a flowchart 1600 illustrating a process that may be performed at a transmitting device coupled to a serial bus. At block 1602, the device may provide a clock signal on a first line of the serial bus. At block 1604, the device may transmit data on a second line of the serial bus in accordance with timing provided by the clock signal. At block 1606, the device may cause a driver of the first line of the serial bus to enter a high impedance state after transmitting a first edge in the clock signal while transmitting the data on the second line. At block 1608, the device may detect a first pulse on the clock signal while the driver of the first line is in the high impedance state. At block 1610, the device may cause the driver of the first line of the serial bus to exit the high impedance state prior to transmitting a second edge in the clock signal. The first edge and the second edge may transition in opposite directions. At block 1612, the device may initiate bus arbitration after detecting the first pulse.

In certain examples, the device may determine identity of a first device that transmitted the first pulse based on temporal position of the first pulse between the first edge in the clock signal and the second edge in the clock signal. A second pulse may be detected on the clock signal while the driver of the first line is in the high impedance state. The device may determine identity of a second device that transmitted the second pulse based on temporal position of the first pulse between the first edge in the clock signal and the second edge in the clock signal. The device may select a winning device from the first device and the second device based on an outcome of the bus arbitration. Based on the outcome of the bus arbitration, the winning device may be provided with access to the serial bus, the first device may be caused to relinquish ownership of the serial bus, and/or cause a transmission in flight or process over the serial bus to be stopped. The winning device may be an identified device. In one example, the device may select a winning device from the first device and the second device based on an outcome of the bus arbitration, and relinquish ownership of the serial bus to the winning device.

In some examples, there may be two bus masters coupled to the serial bus and the device may relinquish ownership of the serial bus to the first device.

In various examples, the device may cause the driver of the first line to enter a high impedance state after transmitting a third edge in the clock signal, the first edge and the third edge occurring in different cycles of the clock signal, determine whether a second pulse is transmitted on the clock signal while the driver of the first line is in the high impedance state after the third edge, initiate bus arbitration when the second pulse is transmitted, and ignore the first pulse when the second pulse is not transmitted. The device may determine identity of a first device that transmitted the first pulse based on temporal position of the first pulse between the first edge in the clock signal and the second edge in the clock signal, initiate bus arbitration when the second pulse is transmitted in a same temporal position relative to the third edge, and ignore the first pulse when the second pulse is not transmitted in the same temporal position relative to the third edge.

Figure 17:
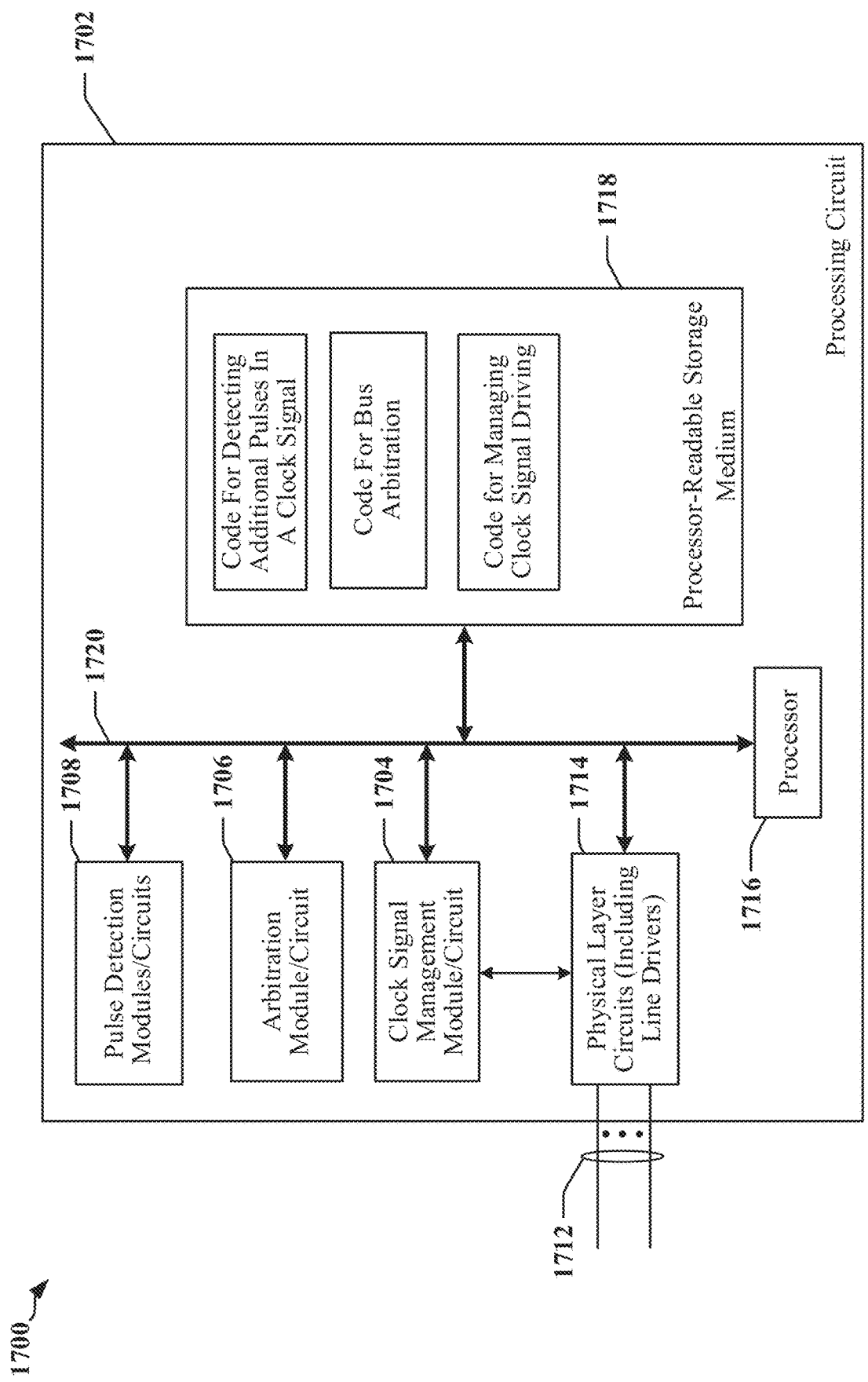
FIG. 17 illustrates a hardware implementation for a transmitting apparatus adapted to respond to support multi-line operation of a serial bus in accordance with certain aspects disclosed herein.

FIG. 17 is a diagram illustrating a simplified example of a hardware implementation for a data communication apparatus 1700 employing a processing circuit 1702. The processing circuit typically has a controller or processor 1716 that may include one or more microprocessors, microcontrollers, digital signal processors, sequencers and/or state machines. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the controller or processor 1716, the modules or circuits 1704, 1706 and 1708, and the processor-readable storage medium 1718. The apparatus may be coupled to a multi-wire communication link using physical layer circuits 1714. The physical layer circuits 1714 may operate the multi-wire serial bus 1712 to support communications in accordance with I3C protocols. The bus 1720 may also link various other circuits such as timing sources, peripherals, voltage regulators, and power management circuits, which are well known in the art, and therefore, will not be described any further.

The processor 1716 is responsible for general processing, including the execution of software, code and/or instructions stored on the processor-readable storage medium 1718. The computer-readable storage medium may include a non-transitory storage medium. The software, when executed by the processor 1716, causes the processing circuit 1702 to perform the various functions described supra for any particular apparatus. The computer-readable storage medium may be used for storing data that is manipulated by the processor 1716 when executing software. The processing circuit 1702 further includes at least one of the modules 1704, 1706 and 1708. The modules 1704, 1706 and 1708 may be software modules running in the processor 1716, resident/stored in the processor-readable storage medium 1718, one or more hardware modules coupled to the processor 1716, or some combination thereof. The modules 1704, 1706 and 1708 may include microcontroller instructions, state machine configuration parameters, or some combination thereof.

In one configuration, the data communication apparatus 1700 includes clock signal management modules and/or circuits 1704, and physical layer circuits 1714 that provide a first line driver coupled to a first wire of a multi-wire serial bus and a second line driver coupled to a second wire of the multi-wire serial bus 1712. The data communication apparatus 1700 may include modules and/or circuits 1708 configured to detect additional pulses transmitted by another device on the clock signal of the serial bus, and modules and/or circuits 1706 configured to arbitrate between devices contending for access to the serial bus.

The data communication apparatus 1700 may include a bus interface configured to couple the data communication apparatus 1700 to a serial bus, the bus interface including a line driver adapted to drive a first line of the serial bus, and a controller or other processing device. The controller may be configured to provide a clock signal on the first line of the serial bus, transmit data on a second line of the serial bus in accordance with timing provided by the clock signal, cause the line driver to enter a high impedance state after transmitting a first edge in the clock signal while transmitting the data on the second line, detect a first pulse on the clock signal while the line driver is in the high impedance state, cause the line driver to exit the high impedance state prior to transmitting a second edge in the clock signal, and initiate bus arbitration after detecting the first pulse. The first edge and the second edge may transition in opposite directions.

In certain examples, the controller is configured to determine identity of a first device that transmitted the first pulse based on temporal position of the first pulse between the first edge in the clock signal and the second edge in the clock signal. The controller may be configured to detect a second pulse on the clock signal while the driver of the first line is in the high impedance state, and determine identity of a second device that transmitted the second pulse based on temporal position of the first pulse between the first edge in the clock signal and the second edge in the clock signal.

In one example, the controller is configured to select a winning device from the first device and the second device based on an outcome of the bus arbitration, and provide the winning device with access to the serial bus. In another example, the controller is configured to select a winning device from the first device and the second device based on an outcome of the bus arbitration, and relinquish ownership of the serial bus to the winning device.

In one example, the controller is configured to relinquish ownership of the serial bus to the first device when only two masters are coupled to the serial bus.

In some examples, the controller is configured to cause the driver of the first line to enter a high impedance state after transmitting a third edge in the clock signal, the first edge and the third edge occurring in different cycles of the clock signal, determine whether a second pulse is transmitted on the clock signal while the driver of the first line is in the high impedance state after the third edge, initiate bus arbitration when the second pulse is transmitted, and ignore the first pulse when the second pulse is not transmitted. The controller may be configured to determine identity of a first device that transmitted the first pulse based on temporal position of the first pulse between the first edge in the clock signal and the second edge in the clock signal, initiate bus arbitration when the second pulse is transmitted in a same temporal position relative to the third edge, and ignore the first pulse when the second pulse is not transmitted in the same temporal position relative to the third edge.

In another example, the processor-readable storage medium 1718 maintains code for providing a clock signal on a first line of the serial bus, transmitting data on a second line of the serial bus in accordance with timing provided by the clock signal, causing a driver of the first line of the serial bus to enter a high impedance state after transmitting a first edge in the clock signal while transmitting the data on the second line, detecting a first pulse on the clock signal while the driver of the first line is in the high impedance state, causing the driver of the first line of the serial bus to exit the high impedance state prior to transmitting a second edge in the clock signal, and initiating bus arbitration after detecting the first pulse. The first edge and the second edge may transition in opposite directions.

Figure 18:
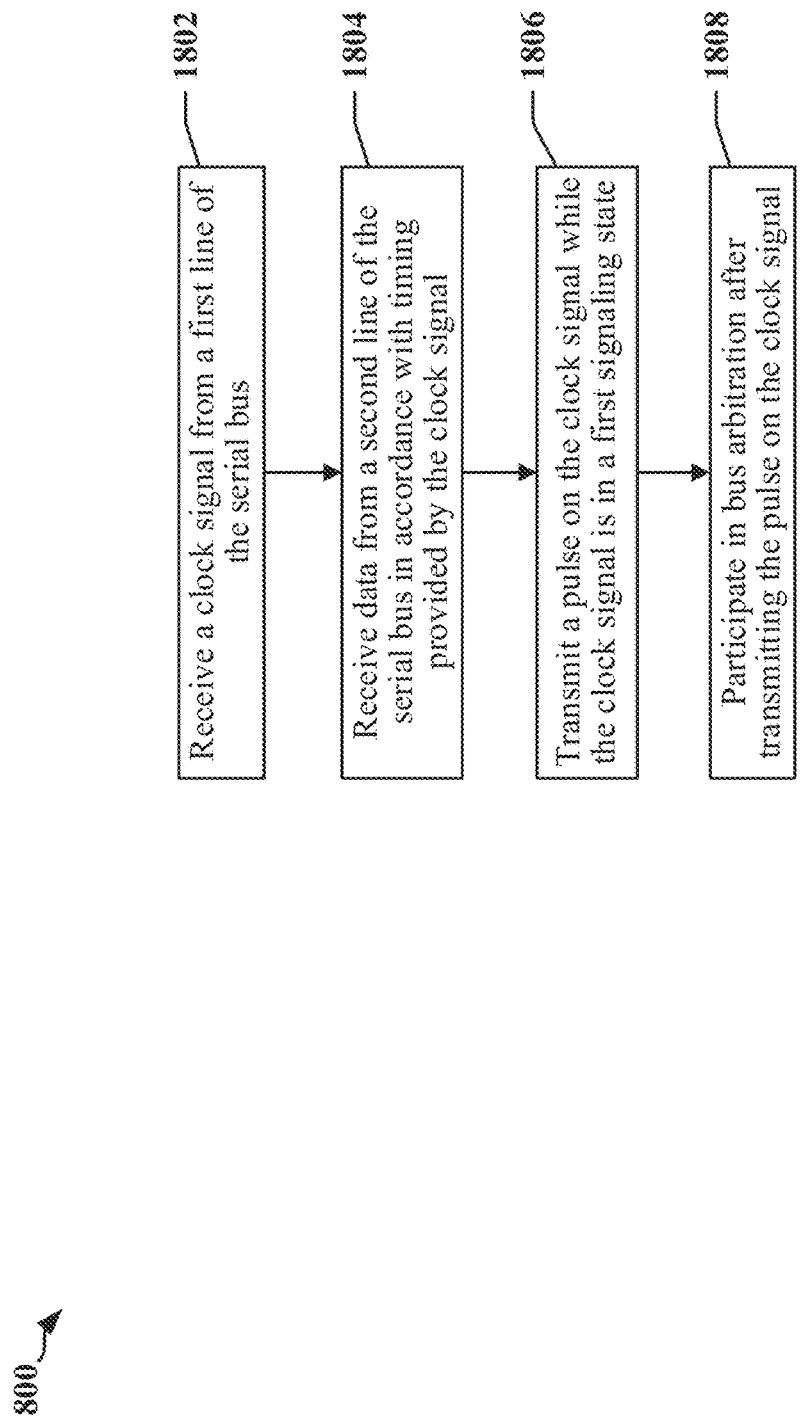
FIG. 18 is a flowchart illustrating a process that may be performed at a receiving device coupled to a serial bus in accordance with certain aspects disclosed herein.

FIG. 18 is a flowchart 1800 illustrating a process for transmitting data over a serial bus that may be performed at a device coupled to the serial bus that is receiving data. At block 1802, the device may receive a clock signal from a first line of the serial bus. At block 1804, the device may receive data from a second line of the serial bus in accordance with timing provided by the clock signal. At block 1806, the device may transmit a pulse on the clock signal while the clock signal is in a first signaling state. At block 1808, the device may participate in bus arbitration after transmitting the pulse on the clock signal.

In one example, the device may configure a temporal position of the pulse relative to at least one edge in the clock signal. The temporal position of the pulse may identify a source of the pulse. The temporal position of the pulse may be determined by configuration information. The device may detect a first edge in the clock signal, and delay transmission of the pulse by a period of time that uniquely identifies a source of the pulse, after detecting the first edge in the clock signal. The device may acquire control of the serial bus after winning the bus arbitration.

Figure 19:
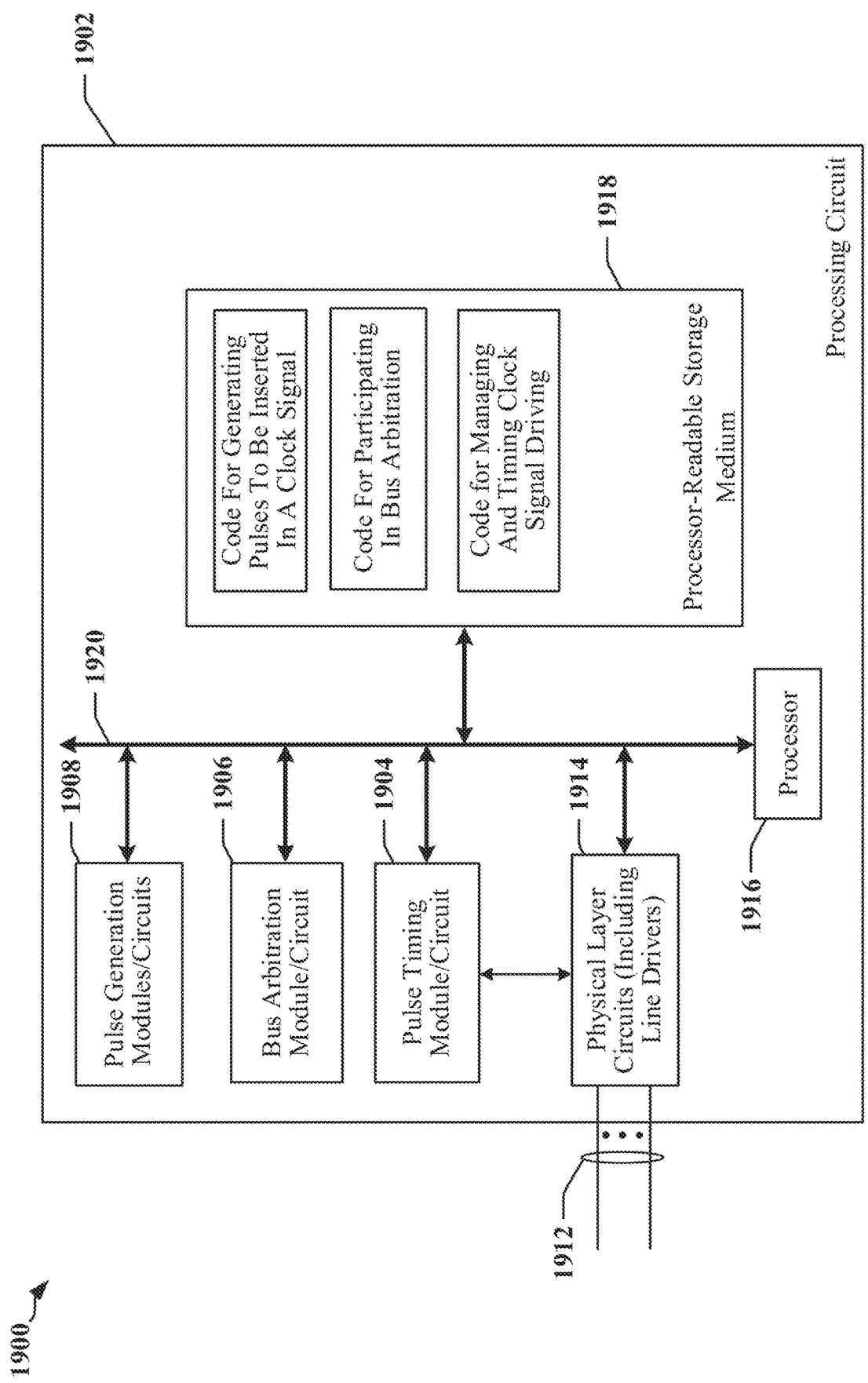
FIG. 19 illustrates a hardware implementation for a receiving apparatus adapted to respond to support multi-line operation of a serial bus in accordance with certain aspects disclosed herein.

FIG. 19 is a diagram illustrating a simplified example of a hardware implementation for a data communication apparatus 1900 employing a processing circuit 1902. The processing circuit typically has a controller or processor 1916 that may include one or more microprocessors, microcontrollers, digital signal processors, sequencers and/or state machines. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the controller or processor 1916, the modules or circuits 1904, 1906 and 1908, and the processor-readable storage medium 1918. The apparatus may be coupled to a multi-wire communication link using physical layer circuits 1914. The physical layer circuits 1914 may operate the multi-wire serial bus 1912 to support communications in accordance with I3C protocols. The bus 1920 may also link various other circuits such as timing sources, peripherals, voltage regulators, and power management circuits, which are well known in the art, and therefore, will not be described any further.

The processor 1916 is responsible for general processing, including the execution of software, code and/or instructions stored on the processor-readable storage medium 1918. The computer-readable storage medium may include a non-transitory storage medium. The software, when executed by the processor 1916, causes the processing circuit 1902 to perform the various functions described supra for any particular apparatus. The computer-readable storage medium may be used for storing data that is manipulated by the processor 1916 when executing software. The processing circuit 1902 further includes at least one of the modules 1904, 1906 and 1908. The modules 1904, 1906 and 1908 may be software modules running in the processor 1916, resident/stored in the processor-readable storage medium 1918, one or more hardware modules coupled to the processor 1916, or some combination thereof. The modules 1904, 1906 and 1908 may include microcontroller instructions, state machine configuration parameters, or some combination thereof.

In one configuration, the data communication apparatus 1900 includes timing modules and/or circuits 1904 used to configure the relative position of pulses inserted into a clock signal, and physical layer circuits 1914 that provide a first line driver coupled to a first wire of a multi-wire serial bus and a second line driver coupled to a second wire of the multi-wire serial bus 1912. The data communication apparatus 1900 may include modules and/or circuits 1908 configured to generate pulses, as needed, for insertion into the clock signal, and modules and/or circuits 1906 configured to participate in an arbitration between devices contending for access to the serial bus.

The data communication apparatus 1900 may include a bus interface configured to couple the data communication apparatus 1900 to a serial bus, the bus interface including a line driver adapted to drive a first line of the serial bus, and a controller or other processing device. The controller may be configured to receive a clock signal on the first line of the serial bus, and receive data on a second line of the serial bus in accordance with timing provided by the clock signal. In certain examples, the controller is configured to transmit a pulse on the clock signal while the clock signal is in a first signaling state. The controller may participate in bus arbitration after transmitting the pulse on the clock signal.

In another example, the processor-readable storage medium 1918 maintains code for receiving a clock signal from a first line of the serial bus, receiving data from a second line of the serial bus in accordance with timing provided by the clock signal, transmitting a pulse on the clock signal while the clock signal is in a first signaling state, and participating in bus arbitration after transmitting the pulse on the clock signal.

The processor-readable storage medium 1918 may further maintain code for configuring a temporal position of the pulse relative to at least one edge in the clock signal, the temporal position of the pulse identifying a source of the pulse. The temporal position of the pulse may be determined by configuration information. The processor-readable storage medium 1918 may further maintain code for detecting a first edge in the clock signal, and delaying transmission of the pulse by a period of time that uniquely identifies a source of the pulse after detecting the first edge in the clock signal. The processor-readable storage medium 1918 may further maintain code for acquiring control of the serial bus after winning the bus arbitration.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for transmitting data comprising:
   transmitting data on a second line of the serial bus in accordance with timing provided by a clock signal transmitted on a first line of the serial bus;
   causing a driver of the first line of the serial bus to enter a high impedance state after-transmitting a first edge in the clock signal while transmitting the data on the second line;
   detecting a first pulse on the clock signal while the driver of the first line is in the high impedance state;
   causing the driver of the first line of the serial bus to exit the high impedance state prior to transmitting a second edge in the clock signal, wherein the first edge and the second edge comprise transitions in opposite directions;
   determining an identity of a first device that transmitted the first pulse based on temporal position of the first pulse between the first edge in the clock signal and the second edge in the clock signal; and
   initiating bus arbitration after detecting the first pulse.

2. The method of claim 1, further comprising:
   detecting a second pulse on the clock signal while the driver of the first line is in the high impedance state; and
   determining an identity of a second device that transmitted the second pulse based on temporal position of the second pulse between the first edge in the clock signal and the second edge in the clock signal.

3. The method of claim 2, further comprising:
   selecting a winning device from the first device and the second device based on an outcome of the bus arbitration; and
   providing the winning device with access to the serial bus.

4. The method of claim 2, further comprising:
   selecting a winning device from the first device and the second device based on an outcome of the bus arbitration; and
   relinquishing ownership of the serial bus to the winning device.

5. The method of claim 1, further comprising:
   relinquishing ownership of the serial bus to the first device.

6. The method of claim 1, further comprising:
   causing the driver of the first line to enter the high impedance state after transmitting a third edge in the clock signal, the first edge and the third edge occurring in different cycles of the clock signal;
determining whether a second pulse is transmitted on the clock signal while the driver of the first line is in the high impedance state after the third edge;
initiating the bus arbitration when the first pulse is detected and the second pulse is transmitted; and
ignoring the first pulse when the second pulse is not transmitted.

7. The method of claim 6, further comprising:
initiating the bus arbitration when the second pulse is transmitted in a same temporal position relative to the third edge; and
ignoring the first pulse when the second pulse is not transmitted in the same temporal position relative to the third edge.

8. An apparatus, comprising:
a bus interface configured to couple the apparatus to a serial bus, the bus interface including a line driver adapted to drive a first line of the serial bus; and
a controller configured to:
transmit data on a second line of the serial bus in accordance with timing provided by a clock signal transmitted on the first line of the serial bus;
cause the line driver to enter a high impedance state after transmitting a first edge in the clock signal while transmitting the data on the second line;
detect a first pulse on the clock signal while the line driver is in the high impedance state;
cause the line driver to exit the high impedance state prior to transmitting a second edge in the clock signal, wherein the first edge and the second edge comprise transitions in opposite directions;
determine an identity of a first device that transmitted the first pulse based on temporal position of the first pulse between the first edge in the clock signal and the second edge in the clock signal; and
initiate bus arbitration after detecting the first pulse.

9. The apparatus of claim 8, wherein the controller is further configured to:
detect a second pulse on the clock signal while the line driver of the first line is in the high impedance state; and
determine an identity of a second device that transmitted the second pulse based on temporal position of the second pulse between the first edge in the clock signal and the second edge in the clock signal.

10. The apparatus of claim 9, wherein the controller is further configured to:
select a winning device from the first device and the second device based on an outcome of the bus arbitration; and
provide the winning device with access to the serial bus.

11. The apparatus of claim 9, wherein the controller is further configured to:
select a winning device from the first device and the second device based on an outcome of the bus arbitration; and
relinquish ownership of the serial bus to the winning device.

12. The apparatus of claim 8, wherein the controller is further configured to:
relinquish ownership of the serial bus to the first device.

13. The apparatus of claim 8, wherein the controller is further configured to:
cause the line driver of the first line to enter the high impedance state after transmitting a third edge in the clock signal, the first edge and the third edge occurring in different cycles of the clock signal;
determine whether a second pulse is transmitted on the clock signal while the line driver of the first line is in the high impedance state after the third edge;
initiate the bus arbitration when the second pulse is transmitted; and
ignore the first pulse when the second pulse is not transmitted.

14. The apparatus of claim 13, wherein the controller is further configured to:
initiate the bus arbitration when the second pulse is transmitted in a same temporal position relative to the third edge; and
ignore the first pulse when the second pulse is not transmitted in the same temporal position relative to the third edge.

15. A non-transitory processor-readable storage medium comprising code for:
transmitting data on a second line of a serial bus in accordance with timing provided by a clock signal transmitted on a first line of the serial bus;
causing a driver of the first line of the serial bus to enter a high impedance state after transmitting a first edge in the clock signal and while transmitting the data on the second line;
detecting a first pulse on the clock signal while the driver of the first line is in the high impedance state;
causing the driver of the first line of the serial bus to exit the high impedance state prior to transmitting a second edge in the clock signal, wherein the first edge and the second edge comprise transitions in opposite directions;
determining an identity of a first device that transmitted the first pulse based on temporal position of the first pulse between the first edge in the clock signal and the second edge in the clock signal; and
initiating bus arbitration after detecting the first pulse.

16. The non-transitory processor-readable storage medium of claim 15, further comprising code for:
detecting a second pulse on the clock signal while the driver of the first line is in the high impedance state; and
determining an identity of a second device that transmitted the second pulse based on temporal position of the second pulse between the first edge in the clock signal and the second edge in the clock signal.

17. The non-transitory processor-readable storage medium of claim 16, further comprising code for:
selecting a winning device from the first device and the second device based on an outcome of the bus arbitration; and
providing the winning device with access to the serial bus.

18. The non-transitory processor-readable storage medium of claim 16, further comprising code for:
selecting a winning device from the first device and the second device based on an outcome of the bus arbitration; and
relinquishing ownership of the serial bus to the winning device.

19. The non-transitory processor-readable storage medium of claim 15, further comprising code for:
relinquishing ownership of the serial bus to the first device.

20. The non-transitory processor-readable storage medium of claim 15, further comprising code for:

causing the driver of the first line to enter the high impedance state after transmitting a third edge in the clock signal, the first edge and the third edge occurring in different cycles of the clock signal;

determining whether a second pulse is transmitted on the clock signal while the driver of the first line is in the high impedance state after the third edge;

initiating the bus arbitration when the first pulse is detected and the second pulse is transmitted; and ignoring the first pulse when the second pulse is not transmitted.

21. The non-transitory processor-readable storage medium of claim 20, further comprising code for:

initiating the bus arbitration when the second pulse is transmitted in a same temporal position relative to the third edge; and ignoring the first pulse when the second pulse is not transmitted in the same temporal position relative to the third edge.

22. A method for receiving data over a serial bus comprising:

receiving a clock signal from a first line of the serial bus;

receiving data from a second line of the serial bus in accordance with timing provided by the clock signal;

transmitting a pulse on the clock signal while the clock signal is in a first signaling state;

configuring a temporal position of the pulse relative to at least one edge in the clock signal, the temporal position of the pulse identifying a source of the pulse; and participating in bus arbitration after transmitting the pulse on the clock signal.

23. The method of claim 22, wherein the temporal position of the pulse is determined by configuration information.

24. The method of claim 22, further comprising:

detecting a first edge in the clock signal; and after detecting the first edge in the clock signal, delaying transmission of the pulse by a period of time that uniquely identifies the source of the pulse.

25. The method of claim 22, further comprising:

acquiring control of the serial bus after winning the bus arbitration.

* * * * *